United States Patent [19]
Ogawa et al.

[11] Patent Number: 5,474,839
[45] Date of Patent: Dec. 12, 1995

[54] SURFACE-TREATED APPAREL MATERIAL

[75] Inventors: Kazufumi Ogawa, Hirakata; Norihisa Mino, Settu; Mamoru Soga, Osaka, all of Japan

[73] Assignee: Matsushita Electric Industrial Co., Ltd., Kadoma, Japan

[21] Appl. No.: 165,569

[22] Filed: Dec. 13, 1993

Related U.S. Application Data

[63] Continuation of Ser. No. 849,095, Mar. 9, 1992, abandoned.

[30] Foreign Application Priority Data

| Mar. 14, 1991 | [JP] | Japan | 3-049842 |
| Jun. 14, 1991 | [JP] | Japan | 3-143495 |
| Jun. 14, 1991 | [JP] | Japan | 3-143496 |
| Jul. 23, 1991 | [JP] | Japan | 3-182146 |

[51] Int. Cl.$^6$ ..................................... B32B 7/00
[52] U.S. Cl. ................... 428/266; 428/290; 428/391; 428/392; 428/447
[58] Field of Search ................. 428/245, 246, 428/252, 266, 267, 290, 375, 337, 378, 391, 392; 8/115.6, 115.64, 115.56, 115.65; 424/402

[56] References Cited

U.S. PATENT DOCUMENTS

| 3,950,588 | 4/1976 | McDougal . | |
| 4,673,474 | 6/1987 | Ogawa | 522/99 |
| 4,696,838 | 9/1987 | Miyata et al. | 427/407.2 |
| 4,786,603 | 11/1988 | Wielanger | 436/69 |
| 4,794,002 | 12/1988 | Henis | 424/488 |
| 5,011,518 | 4/1991 | Oyawa | 55/158 |
| 5,093,154 | 3/1992 | Hatada et al. | 427/43.1 |
| 5,104,729 | 4/1992 | Stedronsky | 428/304.4 |
| 5,114,737 | 5/1992 | Ogawa et al. | 427/36 |
| 5,157,066 | 10/1992 | Shoji et al. | 524/220 |
| 5,225,274 | 7/1993 | Ogawa et al. | 428/333 |

FOREIGN PATENT DOCUMENTS

| 0221046 | 5/1987 | European Pat. Off. . |
| 0484886 | 5/1992 | European Pat. Off. . |
| 0491251 | 6/1992 | European Pat. Off. . |
| 672716 | 5/1952 | United Kingdom . |
| 1102911 | 2/1968 | United Kingdom . |

OTHER PUBLICATIONS

Netzer et al., "Thin Solid Films" 99:235–241 (1983).
Japan Society of Applied Physics Catalog No.: AP901110-03 (English language translation attached).
Ogawa et al., "Langmuir" 6(4):851–856 (1990).
Mullin et al.,"The American Physical Society", 39(7):3745–3747 (Apr. 1, 1989).
Netzer et al., "J. Am. Chem. Soc." 105:674–676 (1983).

Primary Examiner—Ralph H. Dean
Attorney, Agent, or Firm—Fish & Richardson

[57] ABSTRACT

According to the invention, a chemically adsorbed film is formed on an apparel material which has a surface layer containing fluorocarbon groups and a stem which is chemically bonded by —Si— bonds to the material. A high performance apparel material thus can be provided which retains intrinsic properties of material such as ventilation and aesthetic appearance and is excellently durable and highly water- and oil-repelling and anti-contaminating or excellently durable and highly hydrophilic. The chemically adsorbed film has a very thin surface layer containing fluorocarbon groups, and is thus excellently water- and oil-repelling and anti-contaminating. In addition, since its stem is chemically bonded via —Si— bonds to the material, it does not separate and is excellently durable. Further, it is very thin and does not adversely effect intrinsic properties of material such as ventilation, color and aesthetic appearance.

12 Claims, 14 Drawing Sheets

5,474,839

SURFACE-TREATED APPAREL MATERIAL

This application is a continuation of U.S. application Ser. No. 07/849,095 filed Mar. 9, 1992, now abandoned.

FIELD OF THE INVENTION

The present invention relates to water- and contamination-proof apparel materials and, more particularly, to surface-treated apparel products such as fiber products, woven and knit products, non-woven cloths, sheets, filled items, leather products, fur products artificial leather and artificial fur.

The invention further relates to water- and oil-repelling contamination-proof apparel materials or hydrophilic apparel materials and, more particularly, to high performance chemical or synthetic fiber apparel products, typically underwear, sport wear, socks, stockings, and artificial wigs.

BACKGROUND OF THE INVENTION

For making fiber or like apparel materials contamination-proof or water-repelling while retaining a certain degree of ventilation, it has been proposed to form a porous coating film having very small pores by spray coating fluorocarbon-based emulsion (or fluorine resin). It is also well-known in the art to high density weave comparatively highly shrinking fine fibers and high temperature treat the woven fibers to cause shrinkage thereof.

Further, mink or like natural fur is treated using coating solutions containing silicone or fluorine compounds.

In the prior art, however, it has been very difficult to achieve contamination-free properties or water- and oil-repelling properties while retaining a certain degree of ventilation. More specifically, porous coating films of fluorine or urethane resins greatly decreases ventilation, thus leading to mustiness. In addition durability is not significantly increased. High shrinkage treatment, on the other hand, provides only minimal water-repelling properties because the material itself is not water-repelling. Therefore, it is not helpful during such situations as intense rain.

Further, treatment provided on mink or like natural fur using coating liquids containing silicone or fluorine compounds poses problems in durability.

On the other hand, underwear, sport wear, socks and stockings made of synthetic fibers may be very light and airy because the fibers themselves are less water- or moisture-absorbing. That is, they can be thin and permit smart body line design and have excellent fashionability. However, almost all synthetic fibers except for vinylon, are hydrophobic and are therefore uncomfortable when worn while sweating or in high temperature, high relative humidity conditions. Further, since they are hydrophobic, they are easily electrically charged and tend to stick to the body. To alleviate this problem, it is known to add fiber treatment agents or to spray coat anti-charging agents on the fibers.

However, prior art treatment agents or anti-charging agents are less effective in providing for hydrophilic properties and provide substantially no durability enhancement. Making the sole fiber surface hydrophilic without adversely effecting the intrinsic characteristics of hydrophobic fibers, such as synthetic and chemical fibers as noted above, is important from the standpoint of comfort of the underwear, sport wear and other apparel products made of these fibers. These characteristics are strongly demanded in the fiber industries and by consumers.

An object of the invention is to provide a high performance apparel material, which retains intrinsic ventilation of material and is excellently durable and is highly water- and oil-repelling and contamination-proof, thus giving a solution to the above problems inherent in the prior art.

Another object of the invention is to provide an apparel material in which the surface of hydrophobic fibers such as synthetic and chemical fibers is made hydrophilic, thus giving a solution to the above problems inherent in the prior art.

SUMMARY OF THE INVENTION

An object of the invention is to provide an apparel product comprising a chemically adsorbed monomolecular film having a stem thereof bonded by covalent bonds to the surface of the apparel product.

It is preferable in this invention that the chemically adsorbed monomolecular film formed on a siloxane-based monomolecular inner layer film.

It is preferable in this invention that the covalent bond contains a —Si— bonds.

It is preferable in this invention that the chemically adsorbed film has surface fluorocarbon groups.

It is preferable in this invention that the chemically adsorbed film has a portion containing hydrophilic functional groups.

It is preferable in this invention that the apparel product is a synthetic fiber swimsuit.

It is preferable in this invention that the apparel product is a synthetic fiber fabric.

It is preferable in this invention that the apparel product is an artificial wig having chemical or synthetic fibers.

It is preferable in this invention that the hydrophilic functional group of the chemically adsorbed film includes at least one functional group selected from a group consisting of —OH, —COOH, —NH$_2$, —N$^+$R$_3$X$^-$ (where R represents an alkylene group, and X represents a halogen atom), —NO$_2$ and —SO$_3$H.

It is preferable in this invention that the chemically adsorbed film is a compound of the formula

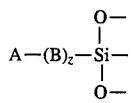

where A represents a —OH, —COOH, —NH$_2$, —N$^+$R$_3$X$^-$ (where R represents an alkylene group, and X represents a halogen atom), —NO$_2$ or —SO$_3$H group, z represents an integer from 1 to 30, and B represents a hydrocarbon group or functional group.

According to the invention, a chemically adsorbed film is formed on an apparel material which has a surface layer containing fluorocarbon groups and a stem chemically bonded by siloxane bonds to the substrate. A high performance apparel material thus can be provided which retains intrinsic properties of material such as ventilation and aesthetic appearance and is excellently durable and highly water- and oil-repelling and contamination-proof. The chemically adsorbed film has a very thin surface layer containing fluorocarbon groups, and is thus excellently water- and oil-repelling and contamination-proof. In addition, since its stem is chemically bonded via siloxane bonds to the material, it does not separate and is excellently durable. Further, it is very thin and does not adversly effect intrinsic properties of material such as ventilation, color and aesthetic appearance.

Further, according to the invention the chemically adsorbed film is a monomolecular film. Thus, it is possible to provide a high performance apparel material which is thin, excellently transparent and highly water- and oil-repelling and contamination-proof. Where the chemically adsorbed film is a polymer film, it is possible to provide highly dense and thick of film. Particularly, improvement in the water separation of swimsuit cloth or the water-repelling properties of cloth surfaces without adversely effecting the properties of nylon and polyurethane fibres, is very important from the standpoint of providing very functional swimsuits. According to the invention, a fluorocarbon-based monomolecular film having a thickness on the order of nanometers order is formed directly or indirectly on fiber or cloth swimsuit surface. Therefore, the intrinsic color and flexibility of the fiber or cloth are not adversely effected. Further, the fluorocarbon-based monomolecular film is chemically bonded (i.e., covalently bonded) by —Si— bonds, and therefore is not separated when the suit is taken on and off, during swimming, or while the suit is washed. Furthermore, the fluorocarbon-based monomolecular film is very excellently water-repelling and can make the fiber surface more water-separating and -repelling. Moreover, with such swimsuit the surface tension is low, and it is thus possible to increase the buoyancy. Thus, a high performance swimsuit can be provided.

Since according to the invention a hydrophilic monomolecular film having a thickness on the order of nanometer is formed on an apparel material, it is possible to selectively make only the surface of the fiber material hydrophilic. Intrinsic water-free characters of the synthetic fiber material such as luster and resiliency are not spoiled.

It is thus possible to provide a high performance apparel material, which is highly hydrophilic and has excellent feel. Particularly, since only the surface of polyester or like hydrophobic fibers is made hydrophilic, water or moisture is passed to the outside of the fiber material at the time of sweating (i.e., a water or moisture transfer effect is provided). In addition, the clothing itself is less cold and can be very comfortably worn.

Artificial wigs are produced from chemical synthetic fiber filaments of nylon, acrylic acid, polyester capable of dying with dispersed dyes, basic polyester capable of dying, rayon, acetate, etc. Human hair is also used.

However, wigs produced from human hair are expensive. In addition, when they absorb sweat, they elongate thereby adversely effecting hair style. In the artificial wig according to the invention, at least the hair portion comprises chemical synthetic fibers, the surface of which is covered by a chemically adsorbed monomolecular film containing hydrophilic groups.

The chemically adsorbed monomolecular film is formed as a result of very highly hydrophilic functional groups being secured via chemically adsorbed molecules and by chemical bonds. Thus, electrical charges are reduced. Further, even if the filaments themselves are water-repelling and do not absorb sweat, sweat wets the filament surface and is spread over the entire surface to be evaporated. Therefore, the artificial wig does not readily become musty, and its collapse is reduced. Besides, the monomolecular film has a thickness at the nanometer level, and it will not deteriorate the intrinsic resiliency of the synthetic filaments. Further, it does not deteriorate the color tone and luster of the synthetic filament hair. Furthermore, it is chemically bonded by covalent bonds to the chemical synthetic fiber filaments. Therefore, it is excellently durable and less liable to be separated by washing hair or combing the hair with a comb or a brush.

Further, the hydrophilic group in the chemically adsorbed monomolecular film according to the invention includes at least one functional group selected from a group consisting of —OH, —COOH, —NH$_2$, —N$^+$R$_3$X$^-$ (where R represents an alkylene group, and X represents a halogen atom), —NO$_2$ and —SO$_3$H. It is possible to obtain a fiber surface which more closely resembles human hair.

DETAILED DESCRIPTION OF THE INVENTION

Figure 1:
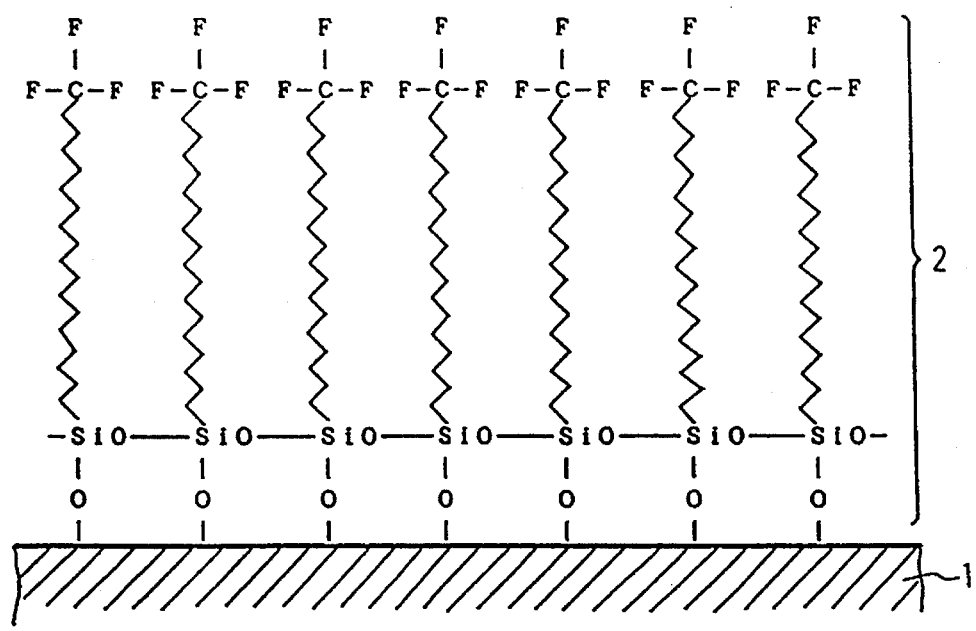
FIG. 1 shows a cotton fiber as in example 1 of the invention.

Usual apparel products are made of natural fibers, leather and fur, and therefore their surface contains hydroxyl, amino and like groups. According to the invention, a fluorocarbon-based chemically adsorbed monomolecular laminated film can be formed on the surface of fibers by a step of contacting the fibers with a non-aqueous solution containing molecules containing a straight carbon chain having a chlorosilane group (or —SiCl$_3$X$_{3-x}$ group, n represents 1, 2 or 3, X represents a functional group), e.g., a chlorosilane-based surface active material containing a fluorocarbon and a chlorosilane group to cause a reaction between amino groups at the fiber surface and chlorosilane groups of the chlorosilane-based surface active material so as to form a precipitated monomolecular film of the material on the fiber surface or contacting the fibers with a non-aqueous solution containing a material containing a plurality of chlorosilyl groups to cause a reaction between hydroxyl and amino groups at the fiber surface and chlorosilyl groups of the material containing a plurality of chlorosilyl groups so as to precipite the material on the fiber surface, a step of washing away excess material containing a plurality of chlorosilyl groups from the fiber surface to thereby form a siloxane-based monomolecular film of the material containing a plurality of siloxane groups; and a step of chemically adsorbing a silane-based surface active material containing a straight carbon chain having an end chlorosilane group to the fibers to thereby form a laminated chemically adsorbed monomolecular film.

Synthetic fibers without any surface hydroxyl groups (e.g., polyester fibers), are preliminarily treated by an oxygen plasma treatment at 100 W for about 30 minutes to provide them with hydroxyl groups and thus make them hydrophilic, and then treated with non-aqueous solution containing a chlorosilane-based surface active material.

According to the invention, a chemically adsorbed film is suitably formed by using a chlorosilane-based surface active material containing a fluoroalkyl group.

Examples of trichlorosilane-based surface active materials of the present invention include $CF_3(CF_2)_7(CF_2)_2SiCl_3$, $CF_3CH_2O(CH_2)_{15}SiCl_3$, $CF_3(CH_2)_2Si(CH_3)_2(CH_2)_{15}SiCl_3$, $F(CF_2)_4(CH_2)_2Si(CH_3)_2(CH_2)_9SiCl_3$, $F(CF_2)_8(CH_2)_2Si(CH_3)_2(CH_2)_9SiCl_3$, $CF_3COO(CH_2)_{15}SiCl_3$, $CF_3(CF_2)_5(CH_2)_2SiCl_3$, $CH_3(CH_2)_9SiCl_3$, $CH_3CH_2O(CH_2)_{15}SiCl_3$, $CH_3(CH_2)_2Si(CH_3)_2(CH_2)_{15}SiCl_3$, $CH_3(CH_2)_6Si(CH_3)_2(CH_2)_9SiCl_3$, $CH_3(CH_2)_{10}Si(CH_3)_2(CH_2)_9SiCl_3$, $CH_3COO(CH_2)_{15}SiCl_3$.

Examples of lower-alkyl substituted monochlorosilane- or dichlorosilane-based surface active materials of the present invention include $CF_3(CF_2)_7(CH_2)_2SiCl_n(CH_3)_{3-n}$, $CF_3(CF_2)_7(CH_2)_2SiCl_n(C_2H_5)_{3-n}$, $CF_3CH_2O(CH_2)_{15}SiCl_n(CH_3)_{3-n}$, $CF_3CH_2O(CH_2)_{15}SiCl_n(C_2H_5)_{3-n}$, $CF_3(CH_2)_2Si(CH_3)_2(CH_2)_{15}SiCl_n(CH_3)_{3-n}$, $CF_3(CF_2)_3(CH_2)_2Si(CH_3)_2(CH_2)_9SiCl_n(C_2H_5)_{3-n}$, $CF_3(CF_2)_7(CH_2)_2Si(CH_3)_2(CH_2)_9SiCl_n(CH_3)_{3-n}$, $CF_3(CF_2)_5(CH_2)_2SiCl_n(CH_3)_{3-n}$, $CF_3COO(CH_2)_{15}SiCl_n(CH_3)_{3-n}$ where n represents 1 or 2.

Among these examples, trichlorosilane-based surface active materials are preferred in that chlorosilyl bonds other than those bonded to their hydrophilic groups form inter-molecular bonds with adjacent chlorosilane groups by siloxane bonds, thereby forming a more firmly adsorbed film.

Trichlorosilane-based surface active materials are particularly preferred because chlorosilyl bonds other than those coupled to their hydrophilic groups form inter-molecular bonds with adjacent chlorosilane groups with siloxane bonds and thus permit formation of a more firmly adsorbed film. Further, $CF_3(CF_2)_n(CH_2)_2SiCl_3$ where n represents an integer, most suitably 3 to 25, is preferred because of its solubility and its water-repelling, anti-contaminating and other functional properties. Further, with an ethylene or acetylene group added to or incorporated in the alkyl fluoride chain portion, the chemically adsorbed film may be crosslinked after formation by irradiating it with an electron beam of about 5 Mrads, thus further improving the hardness of the chemically adsorbed film.

It is thus possible to further improve the hardness of the chemically adsorbed film.

The chlorosilane-based surface active material capable of use according to the invention is not limited to those in the form of a straight chain as noted above. It is possible to use a branched alkyl fluoride or hydrocarbon group or those having a substituted alkyl fluoride or hydrocarbon group with silicon at one end (i.e., those represented by the formula $R_2SiCl_2$, $R_3SiCl$, $R^1R^2SiCl_2$ or $R^1R^2R^3SiCl$ where R, $R^1$, $R^2$ and $R^3$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., $SiCl_4$, $SiHCl_3$, $SiH_2Cl_2$, and $Cl(SiCl_2O)_nCl_3$ (where n represents an integer in a range from 1 to 20), $SiCl_m(CH_3)_{4-m}$, $SiCl_m(C_2H_5)_{4-m}$ (where m represents 1, 2 or 3), and $HSiCl_p(CH_3)_{3-p}$, $HSiCl_p(C_2H_5)_{3-p}$ (where p represents 1 or 2), and then reacting it with water, surface chlorosilyl bonds are converted to hydrophilic silanol bonds, thus making the polymer composition hydrophilic. Among the materials containing a plurality of chlorosilyl groups, tetrachlorosilane ($SiCl_4$) is preferred in that it is highly reactive and low in molecular weight. It can, therefore, provide silanol bonds at a high density. In this way, it is possible to provide a highly hydrophilic composition compared to oxidation treatment of a polymer-containing substrate. To this surface, a chlorosilane-based surface active material containing fluorocarbon groups may be chemically adsorbed. In this way, a chemically adsorbed film suitably having an increased density can be obtained.

Thus, it is possible to make the surface of synthetic fibers or the like hydrophilic.

The apparel, to which the invention pertains, includes fiber, woven and knit products, non-woven cloths, sheets, filled items, leather products, fur products, artificial leather, artificial fur, and papers, more specifically clothing such as hats, mufflers, outerwear, pants, stockings and gloves, Japanese items such as haoris, kimonos, tabis, obis, zoris and getas, rainwear such as umbrellas, tents, tucksacks, ropes, nets, shoes, coats and raincoats, cold weather outfits such as jumpers, anoraks and feathered garments, wadding such as floor cushions, bed covers, carpets, cushions and coverlets, interior items such as feather, furniture, artificial feather and fur, and wall cloths and papers, and also swimsuits, swimming hats, water suits, water jackets, artificial wigs, wigs, hair pieces and hair nets. The following description of examples concerns raincoat cloth.

EXAMPLE 1

Processed cotton raincoat cloth (alternatively hydrophilic cloth such as vinylon) was prepared. After washing well and drying, the cloth was dipped and held in a non-aqueous solution containing a material containing a fluorocarbon and a chlorosilane group, e.g., a solution containing 80% by weight of n-hexadecane (or toluene, xylene, dicyclohexyl, etc.) 12% by weight of carbon tetrachloride and 8% by weight of chloroform, obtained by dissolving 1% by weight of $CF_3(CF_2)_7(CH_2)_2SiCl_3$.

A dehydrochlorination reaction was thus brought about between chlorosilyl (—SiCl) groups in the adsorbed material and hydroxyl groups numerously contained at the fiber surfaces. This reaction is represented in the following formula [1].

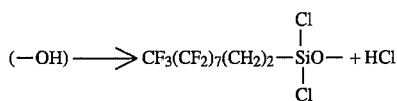

The fiber was then washed with chloroform to remove unreacted material remaining on the surface, followed by washing with water or exposing to air containing moisture so that a monomolecular film is formed on the fiber of cloth. The residual —SiCl group was changed to a —SiOH group as in formula [2].

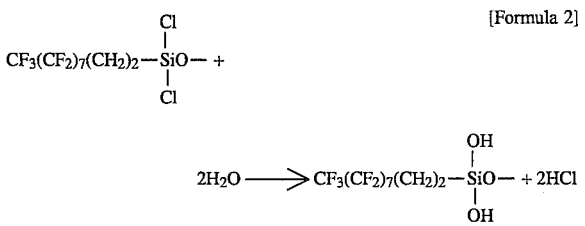

Each silanol group (—SiOH) was then dehydrated and crosslinked to form a siloxane bond (—SiO—) after drying as in formula [3] over the entire cloth fiber surfaces. Drying temperature may be room temperature or above.

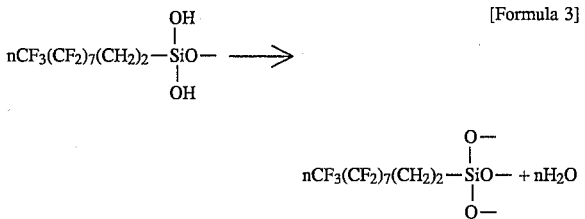

Thus, a fluorine-containing monomolecular film 2 could be formed. The film was chemically bonded (i.e., covalently bonded) to the fiber surface 2. The chemical bond is via siloxane bond. The formation of chemically adsorbed monomolecular film was measured by FTIR spectrometry and thickness was about 1.5 nm (FIG. 1). It was chemically bonded very firmly and did not separate at all.

This treated cloth, which was water- and oil-repelling, was trial used. Compared to non-treated cloth, attached contaminants were greatly reduced and could be readily removed by merely rubbing the cloth with a brush. The water-proof property of the cloth was tested, and it was found that the wetting angle was about 150 degrees and that no water drops remained on the surface at all. Further, the intrinsic characteristics of the material such as ventilation, wear and appearance (i.e., aesthetic look) could be retained.

While this example concerned a cotton product, the surface of a cloth comprising water-repelling synthetic fibers of material such as acrylic acid, polyester or polyamide, may be preliminarily made hydrophilic by treatment in an oxygen-containing plasma atmosphere at 100 W for about 30 minutes. (As other methods of making the cloth hydrophilic, there is one in which the cloth is dipped and held in a solution containing 10% potassium dichromate at 80° C. for three minutes, and another in which the cloth was dipped and held in a concentrated sulfuric acid solution containing 10% potassium perchlorate.) The same method could be utilized for leather and fur products.

EXAMPLE 2

Figure 2:
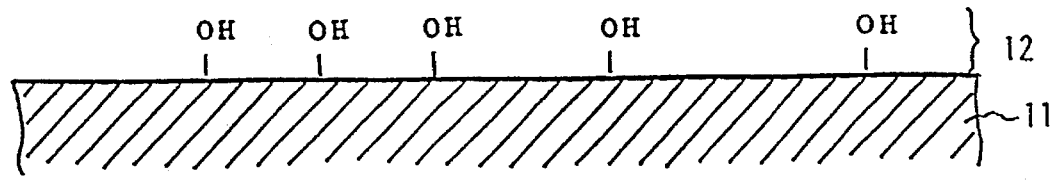
FIG. 2 shows an acryl fiber as in example 2 of the invention.

This example concerns cloth which contains less hydroxyl groups although it is hydrophilic (e.g., plasma-treated acrylic acid fiber cloth). The cloth was dipped and held in a non-aqueous solution containing a material containing a plurality of chlorosilyl groups, e.g., $SiCl_4$, $SiHCl_3$, $SiH_2Cl_2$, and $Cl(SiCl_2O)_nCl_3$ (where n represents an integer in a range from 1 to 20), $SiCl_4$ being small in molecular size and highly active with respect to the hydroxyl groups to provide for a material surface which is uniformly hydrophilic, e.g., a solution obtained by dissolving 1% by weight of the material in chloroform solvent, for about 30 minutes. A dehydrochlorination reaction was brought about on the surface of the material 11 (FIG. 2) due to a certain amount of hydrophilic groups 12 provided at the surface by plasma treatment. Thus, a chlorosilane monomolecular film of the material containing a plurality of trichlorosilyl groups could be formed.

As an example, by using $SiCl_4$ as the material containing a plurality of trichlorosilyl groups, a dehydrochlorination reaction was brought about at the surface of the material 11 due to a small amount of exposed hydrophilic —OH groups. Thus, molecules represented by formulas [4] and/or [5] were secured via —SiO— bonds to the material surface.

Figure 3:
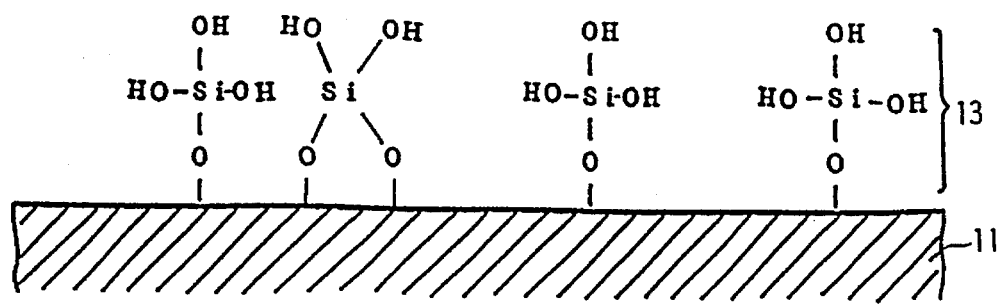
FIG. 3 shows an acryl fiber as in example 2 of the invention.

The cloth was subsequently washed with a solvent, e.g., chloroform, and then with water. As a result, unreacted $SiCl_4$ molecules remaining on the cloth fiber surface were removed by washing and reacted with water to obtain a siloxane monomolecular film 13 (FIG. 3) as represented by formulas [6] and/or [7] on the fiber surface.

The monomolecular film 13 thus obtained was perfectly bonded by chemical bonds of —SiO— to the cloth fibers and did not separate at all. It had numerous silanol (—SiOH) groups at the surface, the number of silanol groups being about three times the initial number of hydroxyl groups.

The cloth provided with the monomolecular film having numerous —SiOH bonds at the surface, was dipped and held for about one hour in a non-aqueous solution containing a material containing a fluorocarbon and a chlorosilane group, e.g., a solution containing 80% by weight of n-hexadecane, 12% by weight of carbon tetrachloride and 8% by weight of chloroform, prepared by dissolving about 3% by weight of $CF_3(CF_2)_7(CH_2)_2SiCl_3$.

Figure 4:
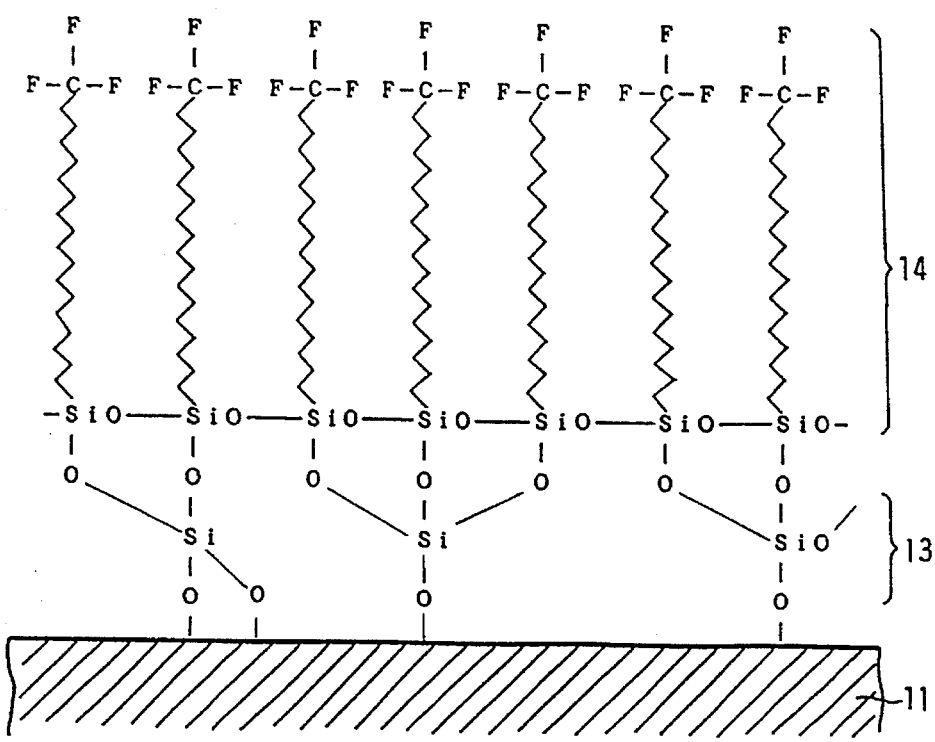
FIG. 4 is shows an acryl fiber as in example 2 of the invention.

The cloth was then washed with chloroform to remove unreacted material remaining on the surface, followed by washing with water or exposing to air containing moisture. As a result, bonds of $CF_3(CF_2)_7(CH_2)_2Si(O-)_3$ were formed. Thus, a fluorine-containing monomolecular film 14 was formed over the entire cloth fiber surfaces as above in formulas 1 to 3. The obtained film was chemically bonded to the inner siloxane monomolecular flim and had a thickness of about 1.5 nm (FIG. 4). This monomolecular film did not separate at all in a peel-off test.

While in this example $CF_3(CF_2)_7(CH_2)_2SiCl_3$ was used as the fluorocarbon-based surface active material, by adding an ethylene or acetylene group to or incorporating the same in an alkyl chain part in advance, the obtained monomolecular film can be crosslinked by irradiating it with about 5 Mrads. of electron beams for further hardness improvement. Further, by adsorbing a combination of two different surface active materials having different molecular lengths (e.g., $F(CF_2)_8(CH_2)_2Si(CH_3)_2(CH_2)_9SiCl_3$ and $F(CF_2)_8(CH_2)_2Si(CH_3)_2(CH_2)_6Cl_3$, or $CF_3(CF_2)_7(CH_2)_2SiCl_3$ and $CF_3(CF_2)_5(CH_2)_2SiCl_3$ mixed in a ratio of 3:1 to 1:3, the material surface may be made irregular at the molecular level. It is thus possible to make the surface further water- and oil-repelling and contamination-proof.

As in the above example, a fluorocarbon-based monomolecular film having a thickness on the order of namometers, is formed on the material surface without adversely effecting the instrinsic color tone or luster of the material. In addition, the film is excellently water- and oil-repelling and can enhance the contamination-proof effects of the surface. Further, it is excellently durable. It is thus possible to provide a very highly water- and contamination-proof high performance apparel material.

EXAMPLE 3

Figure 5:
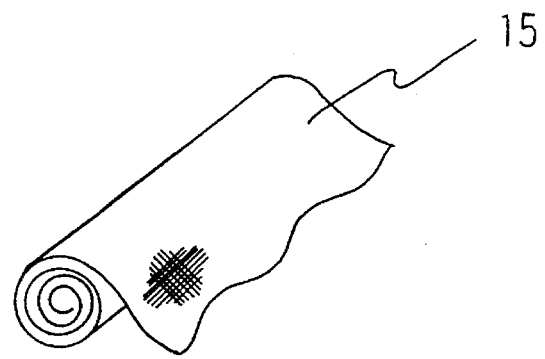
FIG. 5 is a perspective view, showing a nylon-polyurethane fabric as in example 3 of the invention.

Swimsuit cloth 15 (FIG. 5) was prepared by braiding fibers with nylon fibers wound on polyurethane fibers as core. The cloth was then washed well and dried, and then it was dipped and held for about two hours in a non-aqueous solution containing a material containing a fluorocarbon and a chlorosilyl group, e.g., a solution containing 80% by weight of n-hexadecane, 12% by weight of carbon tetrachloride and 8% by weight of chloroform, obtained by dissolving about 1% by weight of $CF_3(CF_2)_7(CH_2)_2SiCl_3$. A dehydrochlorination reaction was thus brought about between chlorosilyl (—SiCl) groups in the material containing a fluorocarbon and chlorosilyl groups and imino groups numerously contained at the cloth fiber surface. The fiber was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond (—SiO—) after drying as in the formula [8].

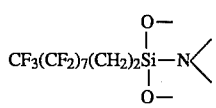

[Formula 8]

Figure 6:
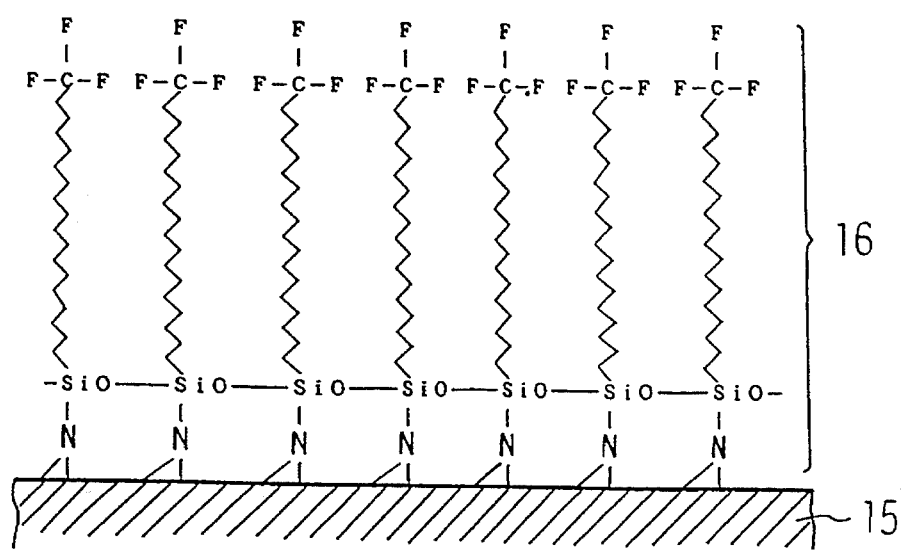
FIG. 6 shows a nylon-polyurethane fiber as in example 3 of the invention.

A fluorine-containing monomolecular film 16 was thus formed (FIG. 6). The film thus obtained was chemically bonded to the nylon and polyurethane fiber surface. Its thickness was about 1.5 nm. It was chemically bonded (i.e., covalently bonded) very firmly to the cloth fibers and did not separate at all.

A swimsuit was produced using the treated water-repelling cloth for trial use. The cloth was found to be excellently water-separating and -repelling compared to non-treated cloth. Its water-wetting angle was measured and found to be about 160 degrees. Further, the surface tension was low, and the buoyancy of the swimsuit was high compared to the conventional swimsuit. Ventilation was comparable to that of non-treated product. While this example concerned cloth, the same method could be utilized for yarn before spinning or for a swimsuit after sewing.

EXAMPLE 4

Figure 7:
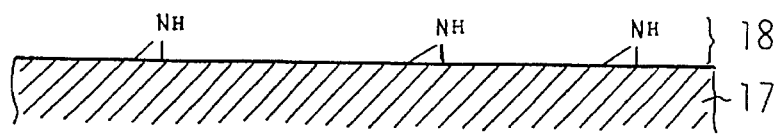
FIGS. 7(a)–(c) show a nylon-polyurethane fiber as in example 4 of the invention.
Figure 7:
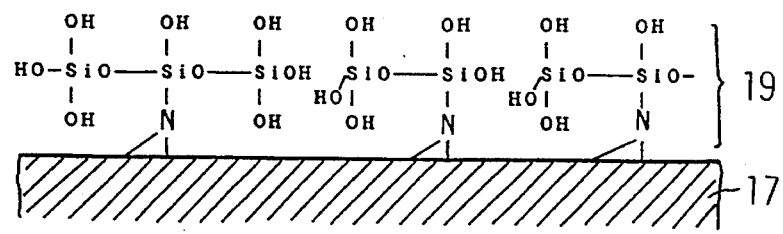
Figure 7:
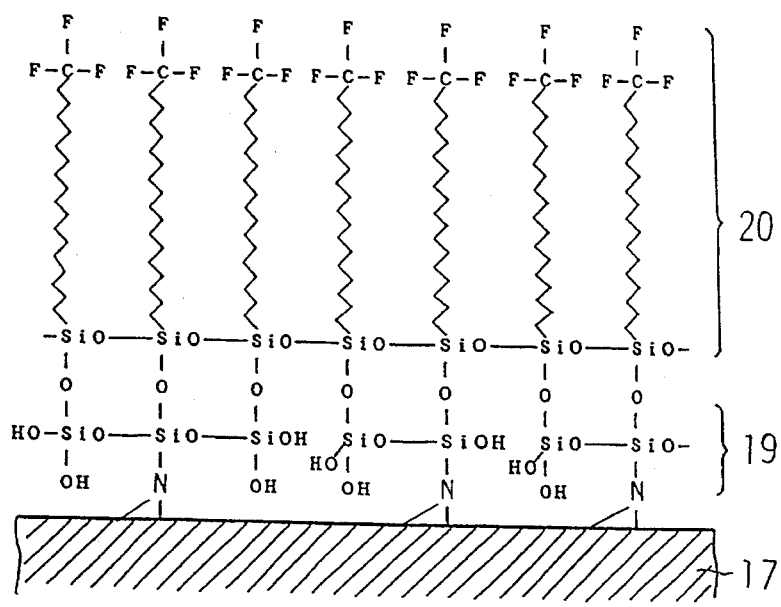

This example seeks improvement of the water-repelling property. To this end, swimsuit cloth prepared by braiding fibers with nylon fibers wound on polyurethane fibers as a core was dipped and held for about 30 minutes in a non-aqueous solution containing a material containing a plurality of chlorosilyl groups, e.g., $Cl(SiCl_2O)_2SiCl_3$ being small in molecular size and highly active with respect to the imino groups to provide a material surface which was uniformly hydrophilic, e.g., a solution obtained by dissolving 1% by weight of the material in chloroform solvent. A dehydrochlorination reaction was thus brought about on the cloth fiber surface owing to a small amount of imino (=NH) groups present at the surface (FIG. 7(a)). Thus, a monomolecular film was formed.

As an example, by using $Cl(SiCl_2O)_2SiCl_3$ as the material containing a plurality of trichlorosilyl groups, a hydrochloric acid removal reaction was brought about on the cloth fiber surface owing to a small amount of imino groups exposed at the surface. Thus, molecules represented by formulas [9] and/or [10] were secured via —SiN< bonds to the surface.

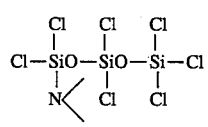

[Formula 9]

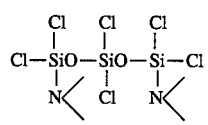

[Formula 10]

The cloth was subsequently washed with a non-aqueous solvent, e.g., chloroform, and then with water. As a result, unreacted $Cl(SiCl_2O)_2SiCl_3$ molecules remaining on the cloth fiber surface were removed to obtain a siloxane monomolecular film 19 (FIG. 7(b)) as represented by formulas [11] and/or [12] on the cloth fiber surface.

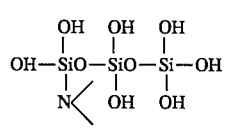

[Formula 11]

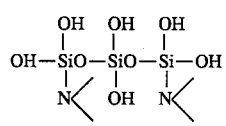

[Formula 12]

The monomolecular film 19 thus obtained was bonded by chemical bonds (or covalent bonds) of —SiN< to the cloth fibers and not separated at all. It had numerous —SiOH bonds at the surface, the number of the —OH groups formed being about 6.5 times the initial number of imino (>NH) groups.

The cloth provided with the monomolecular film having numerous —SiOH groups at the surface, was dipped and held for about one hour in a non-aqueous solution containing a material containing a fluorocarbon and a chlorosilyl group, e.g., a solution containing 80% by weight of n-hexadecane, 12% by weight of carbon tetrachloride and 8% by weight of chloroform, prepared by dissolving 10% by weight of $CF_3(CF_2)_7(CH_2)_2SiCl_3$ were formed on the cloth fiber surfaces.

The cloth was then washed with chloroform to remove unreacted material remaining on the surface, followed by washing with water or exposing to air containing moisture. As a result, bonds of $CF_3(CF_2)_7(CH_2)_2Si(O-)_3$ were formed. Thus, a fluorine-containing monomolecular film 20 was formed over the entire cloth fiber surfaces (FIG. 7(c)) as above in formulas [1] to [3].

The film thus obtained was chemically bonded to the inner siloxane monomolecular film. Its thickness was about 1.5 nm. It did not separate at all in a peel-off test. In actual use, it was found to be more excellently water-repelling than the film obtained in Example 3.

As in the above example, a fluorocarbon-based monomolecular film which has a thickness on the order of nanometers, is formed on the fiber surface without spoiling the intrinsic color tone or luster of the swimsuit. In addition, the fluorocarbon-based monomolecular film is chemically bonded (or covalently bonded) by —Si— bonds to the fiber surfaces, and thus doess not separate when taking on and off the swimsuit, during swimming or while the swimsuit is washed. It is excellently water-repelling and can enhance water separation and repelling of the swimsuit surface and reduce resistance offered to water.

In the meantime, the method according to the invention can be utilized when making the fiber surface hydrophilic, as will be described later in detail in connection with the examples.

As apparel to which the invention pertains, there are such clothes as underwear, sport wear, socks and brief/stockings. Many of these clothes are made of nylon, polyurethane, polyester, acrylic acid and like fibers. With a chemically adsorbed monomolecular film containing hydrophilic functional groups formed via —Si— bonds on the surface of the fiber or cloths before processing, comfortability of wear can be improved. In addition, since the chemically adsorbed monomolecular film is bonded by chemical bonds (or covalent bonds), it does not separate when the clothing is taken on and off or while the clothing is washed. The chemically adsorbed film according to the invention is applicable not only to hydrophobic fibers but also to natural fibers such as cotton, linen and silk as well as blend spin products such as a mixture of cotton and polyester fibers.

EXAMPLE 5

Introduction of a Cyano (—CN) Group

Figure 8:
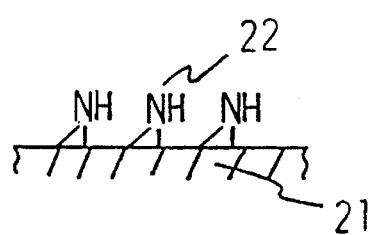
FIGS. 8(a) and (b) show a nylon fiber as in example 5 of the invention.
Figure 8:
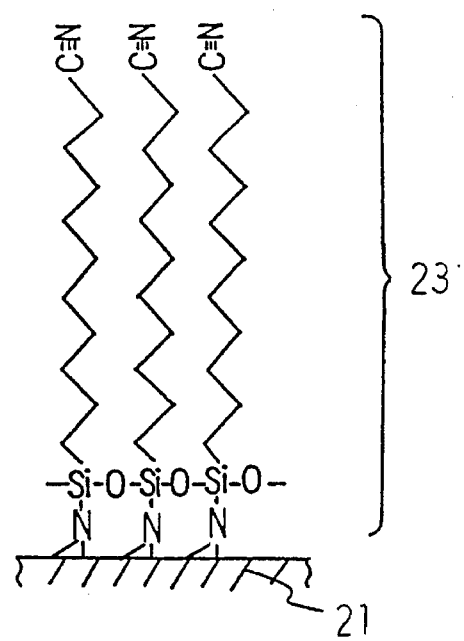

Nylon fibers 21 were prepared (FIG. 8(a)). (Alternatively, it is possible to use polyurethane fibers or cloth woven from such fibers or apparel product obtained from such cloth. With products of synthetic fibers having imino groups, e.g., polyester or acrylic fibers, the fiber surface may be slightly oxidized with a dichromatic acid solution to introduce hydrophilic hydroxyl groups capable of reacting with chlorosilyl groups at the surface.) The fibers were dipped and held for about two hours in a non-aqueous solution containing an adsorbed material having a cyano and a chlorosilyl group, e.g., a solution containing 80% by weight of cyclohexane (or toluene, xylene or dicyclohexyl), prepared by dissolving 1% by weight of $NC(CH_2)_7SiCl_3$.

A dehydrochlorination reaction was thus brought about between chlorosilyl (—SiCl) groups in the adsorbed material and imino groups numerously contained at the fiber surfaces. The fiber was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond (—SiO—) after drying as in the formula [13]. Drying temperature may be room temperature or above.

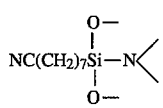

[Formula 13]

By subsequently washing the fibers, a monomolecular film 23 containing cyano groups (FIG. 8(b)) was formed. The film was chemically bonded to the fiber surfaces. Its thickness was about 1.5 nm. It was very firmly chemically (or covalently) bonded to the fibers and did not separate at all as a result of washing and so forth. The treated nylon fibers were used to produce tricot braiding underwear for trial use. The underwear was excellently water- and moisture-permeable and was worn comfortably.

EXAMPLE 6

Introduction of a Thiocyano (—SCN) Group

Figure 9:
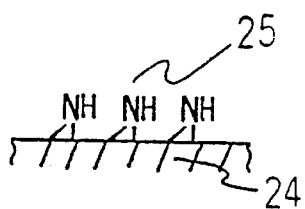
FIGS. 9(a) and (b) show a polyurethane fiber as in example 6 of the invention.
Figure 9:
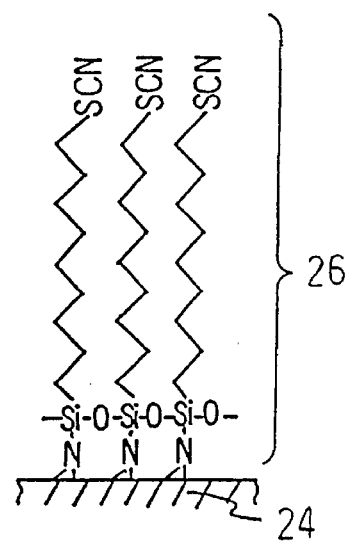

Polyurethane fibers 24 (FIG. 9(a)) were prepared, and then, dipped and held for about five hours in a non-aqueous solution containing an adsorbed material having a thiocyano and a chlorosilyl group, e.g., a solution containing cyclohexane (or toluene, xynele or dicyclohexyl), prepared by dissolving about 2% by weight of $NCS(CH_2)_7SiCl_3$. A dehydrochlorination reaction was thus brought about between chlorosilyl (—SiCl) groups in the adsorbed material and imino groups numerously contained at the fiber surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [14]. Drying temperature may be room temperature or above.

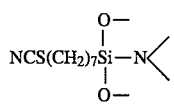

[Formula 14]

A hydrophilic monomolecular flim 26 containing thiocyano groups was thus formed. The film was chemically bonded (or covalently bonded) to the fiber surfaces, and its thickness was about 1.5 nm (FIG. 9(b)). It was very firmly chemically bonded (or covalently bonded) and did not separate at all after washing. The treated polyurethane fibers were used to produce stockings for trial use. The stockings were excellently water- and moisture-permeable and comformtable when worn.

EXAMPLE 7

Introduction of a Hydroxyl (—OH) Group

Nylon fibers 31 (FIG. 10(a)) were prepared, washed with an organic solvent and then dipped and held for about five hours in a non-aqueous solution containing an adsorbed material having an ester (R—COOCH$_2$—, R represents a functional group) bond and a chlorosilyl group, e.g., a solution containing cyclohexane, prepared by dissolving about 2% by weight of H$_3$COOC(CH$_2$)$_7$SiCl$_3$. A dehydrochlorination reaction was thus brought about between chlorosilyl (—SiCl) groups in the material containing an ester bond and a chlorosilyl group and imino groups contained numerously at the fiber surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [15]. Drying temperature may be room temperature or above.

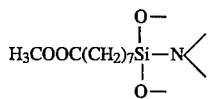
[Formula 15]

A monomolecular film 33 containing ester bonds thus could be formed. The film thus obtained was chemically bonded (or covalently bonded to the fiber surfaces, and its thickness was about 2.0 nm (FIG. 10(b)).

The treated fibers were then reacted in an ether solution containing several percent by weight of lithium aluminium hydride (LiAlH$_4$) at a temperature below room temperature for 20 minutes to introduce hydrophilic hydroxyl end groups so as to form a monomolecular film 34 (FIG. 10(c)) represented by formula [16].

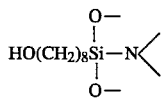
[Formula 16]

The monomolecular film 34 was very firmly chemically bonded (or covalently bonded) to the firbers and did not separate at all. The fibers were further dipped in a cyclohexane solution containing an organic compound of an alkali metal, e.g., LiO(CH$_2$)$_3$CH$_3$ (or NaOCH$_3$) to form a very lighly hydrophilic film 35 (FIG. 10(d)) represented by formula [17].

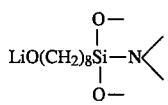
[Formula 17]

As another example, the nylon fibers were washed with an organic solvent and then reacted with a material containing a plurality of chlorosilyl groups, e.g., SiCl$_4$. The fibers were subsequently washed with a solvent, e.g., freon 113, and then with water. As a result, unreacted SiCl$_4$ molecules remaining on the fiber surface were removed to obtain a siloxane monomolecular film as represented by formula [18].

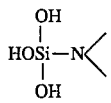
[Formula 18]

A siloxane monomolecular film abundantly containing hydroxyl (—OH) groups thus could be formed. The film was chemically (or covalently) bonded to the fiber surfaces, and its thickness was about 3.0 nm. Subsequent to the above chemical adsorption of SiCl$_4$, the process in Example 5 or 6 was carried out. Thus, a hydrophilic monomolecular film could be formed with a higher density on the fiber surfaces via the siloxane monomolecular film. The film did not separate by washing. The treated nylon fibers were used to produce tricot braiding underwear for trial use. The underwear was found to be excellently water- and moisture-permeable and comfortable when worn.

EXAMPLE 8

Introduction of a Carboxyl (—COOH) Group

Figure 11:
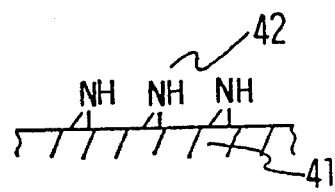
FIGS. 11(a)–(d) show a nylon fiber as in example 8 of the invention.
Figure 11:
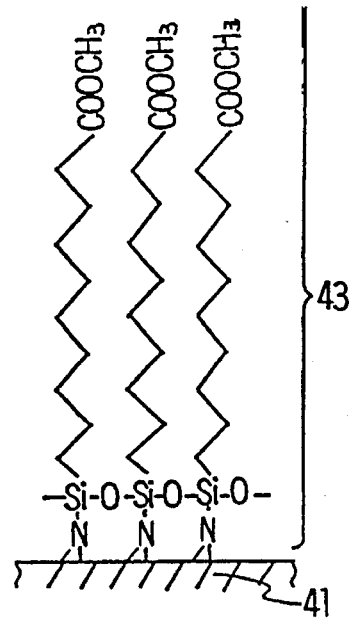
Figure 11:
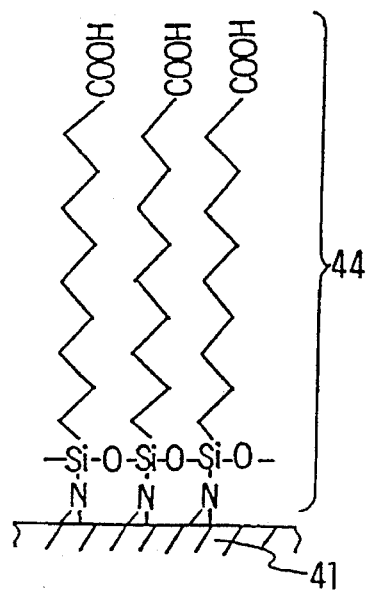
Figure 11:
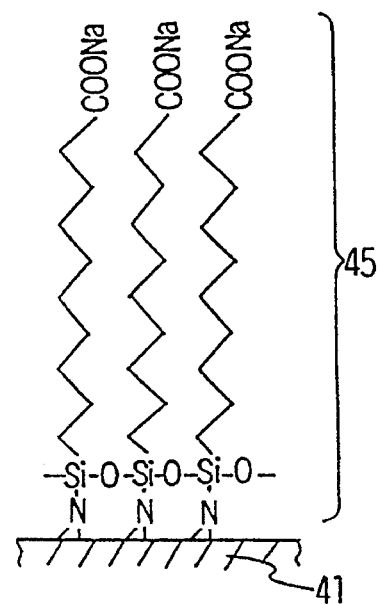

Nylon fibers 41 were prepared (FIG. 11(a)), washed well and dipped and held for about five hours in a non-aqueous solution containing an adsorbed material having an ester bond and a chlorosilyl group in a cyclohexane, prepared by dissolving 2% by weight of H$_3$COOC(CH$_2$)$_{10}$SiCl$_3$. A dehydrochlorination reaction was thus brought about chlorosilyl (—SiCl) groups in the material and imino groups 42 numerously contained at the fiber surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [19]. Drying temperature may be room temperature or above.

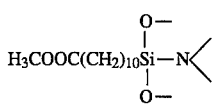
[Formula 19]

A monomolecular film 43 containing ester bonds thus could be formed. The film was chemically (or covalently) bonded to the fiber surfaces, and its thickness was about 2.0 nm (FIG. 11(b)).

The treated fibers were then reacted in a solution containing 6% by weight of hydrochloric acid (HCl) at 65° C. for 30 minutes, thus introducing hydrophilic end carboxyl groups as represented by formula [20].

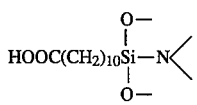
[Formula 20]

A monomolecular film 44 (FIG. 11(c)) was thus formed. This film again was very firmly chemically (or covalently) bonded and did not separate at all.

The fibers were then further dipped and held in an aqueous solution containing an alkali or alkali earth metal compound, e.g., NaOH or Ca(OH)$_2$, thus, bonds formed by formula [21].

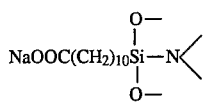

[Formula 21]

A highly hydrophilic monomolecular film 45 (FIG. 11(d)) thus could be formed on the fiber surfaces. This film did not separate by washing. The treated nylon fibers were used to produce tricot braiding for trial use. The braiding was comfortable when worn.

EXAMPLE 9

Introduction of an —$NH_2$ Group

Figure 12:
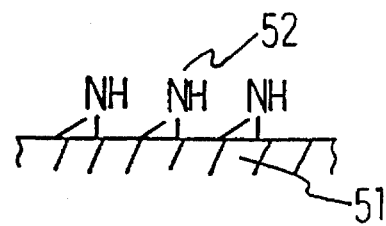
FIGS. 12(a)–(c) show a nylon fiber as in examples 9 and 17 of the invention.
Figure 12:
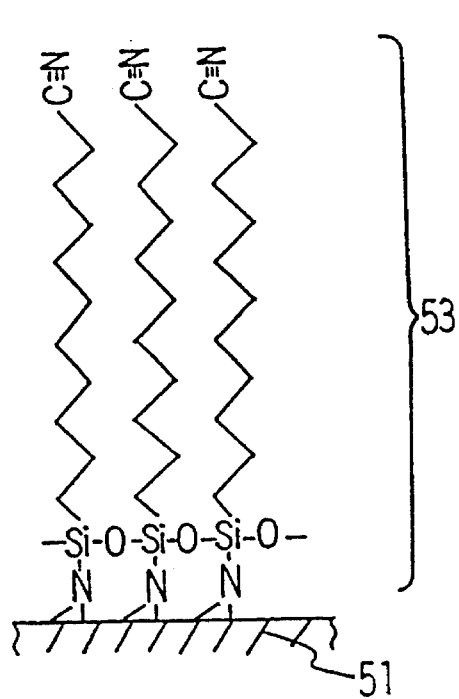
Figure 12:
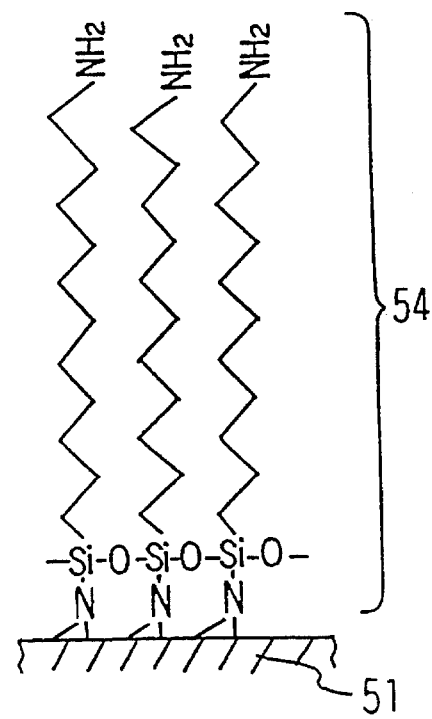

Nylon cloth (FIG. 12(a)) was prepared by dipping and holding the cloth for about two hours in a non-aqueous solution containing an adsorbed material having a cyano and a chlorosilyl group, e.g., a solution containing cylclohexane, prepared by dissolving 1% by weight of $NC(CH_2)_{17}SiCl_3$. A dehydrochlorination reaction was thus brought about between —SiCl groups in the adsorbed material containing a cyano and a chlorosilyl group and imino groups 52 numerously contained at the fiber surfaces. The cloth was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [22]. Drying temperature may be room temperature or above.

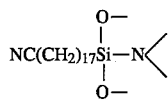

[Formula 22]

A monomolecular film 53 containing cyano groups thus could be formed. The film was chemically (or covalently) bonded to the fiber surfaces (FIG. 12(b)).

The treated fibers were then dipped and held in ether containing dissolved lithium aluminium hydride (10 mg/ml) for overnight reaction. Then, the fibers were taken out from the solution and added to an ether solution containing 10% by weight hydrochloric acid. Thereafter, they were dipped and held in a triethylamine solution for two hours. A highly hydrophilic monomolecular film 54 (FIG. 12(c)) represented by formula [23] was formed.

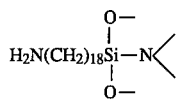

[Formula 23]

This film was firmly chemically (or covalently) bonded to the fibers and did not separate at all.

As a different example of —$NH_2$ group introduction, hydrophilic fibers were prepared, washed with an organic solvent and dipped and held for about two hours in a non-aqueous solution containing a bromo or iodo and a chlorosilyl group, e.g., a solution containing cyclohexane, prepared by dissolving 1% by weight of $Br(CH_2)_{17}SiCl_3$.

A dehydrochlorination reaction was thus brought about betweeen —SiCl groups in the material containing a bromo or iodo and a chlorosilyl group and hydroxyl groups contained numerously at the fiber surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [24]. Drying temperature may be room temperature or above.

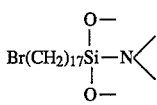

[Formula 24]

A monomolecular film containing bromo groups thus could be formed over the entire fiber surfaces. The film was chemically (or covalently) bonded to the fiber surfaces.

The treated fibers 51 were then held together with an N,N-dimethyl formamide solution containing dissolved sodium amide (8 mg/ml) for overnight reaction. A monomolecular film represented by formula [25] was obtained.

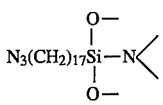

[Formula 25]

The fibers were then dipped and held in ether containing dissolved lithium aluminium hydride (10 mg/ml) for overnight reaction, and then put into an empty container for addition thereto of an ether solution containing 10% by weight hydrochloric acid. Subsequently, the fibers was dipped and held in a triethylamine solution for two hours, followed by washing with chloroform solution. Thus, a monomolecular film represented above in the formula [20] was obtained.

This monomolecular film was very firmly chemically (or covalently) bonded to the fibers and not separated at all. It did not separate by washing. This nylon cloth was used to produce tennis wear for trial use. The tennis wear was excellently water- and moisture-permeable and comfortable when worn.

EXAMPLE 10

Introduction of an =NH Group

Figure 13:
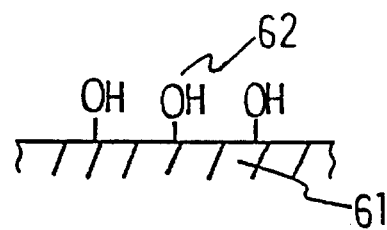
FIGS. 13(a)–(c) show an acryl fiber as in example 10 of the invention.
Figure 13:
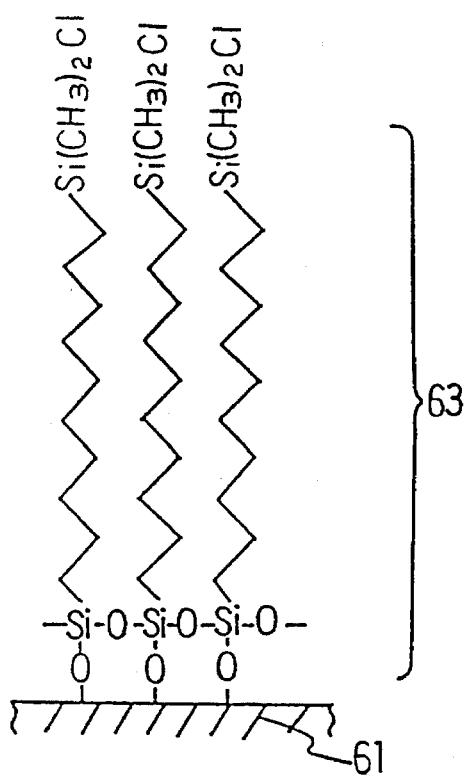
Figure 13:
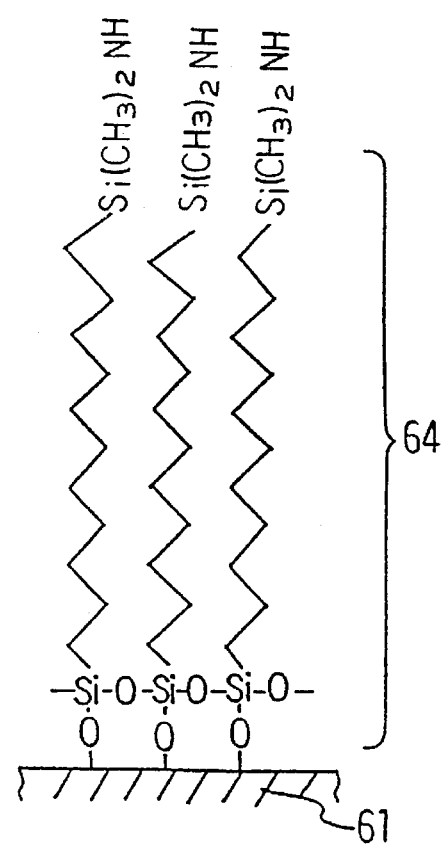

An acrylic fiber (or polyester fiber) sweater with the fiber surfaces thereof treated with a dichromatic acid mixed solution for 30 minutes to introduce hydroxl groups was prepared (FIG. 13(a)), then washed well with water. The sweater was dipped and held for five hours in a non-aqueous solution containing a adsorbed material having a chlorosilyl group at each end e.g., an "Aflood" solution (a fluorine-based solvent provided by Asahi Glass Co.), prepared by dissolving about 2% by weight of

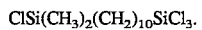

A dehydrochlorination reaction was thus brought about between chlorosilyl (—SiCl) groups at one end of molecules of the material containing a chlorosilyl group at each end and hydroxyl groups 62 numerously contained at the fiber surfaces (FIG. 13(a)). The sweater was then washed with freon 113 to remove unreacted material remaining on the surface. Thus, bonds formed by formula [26] were produced over the entire fiber surfaces.

[Formula 26]

A monomolecular film 63 containing chlorosilyl groups (FIG. 13(b)) thus could be formed. The film was chemically (or covalently) bonded to the fiber surfaces.

The treated fibers were then dipped in "Aflood" solvent containing 10% by weight of $CH_3NH_2$ for a dehydrochlorination reaction, and then washed with "Aflood" solution. Thus, bonds formed by formula [27] were produced over the entire fiber surfaces.

[Formula 27]

Thus, a hydrophilic monomolecular film 64 could be obtained (FIG. 13(c)).

This monomolecular film was very firmly chemically (or covalently) bonded and did not separate at all. Also, it did not separate by washing. The acrylic fiber sweater thus obtained was trial used and found to be excellently water- and moisture-repelling and comfortable when worn.

EXAMPLE 11

Introduction of a —$N^+R_3X^-$ (X representing a halogen atom) Group

Figure 14:
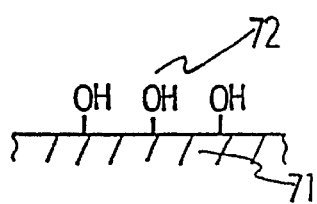
FIGS. 14(a)–(d) show a polyester fiber as in examples 11 and 18 of the invention.
Figure 14:
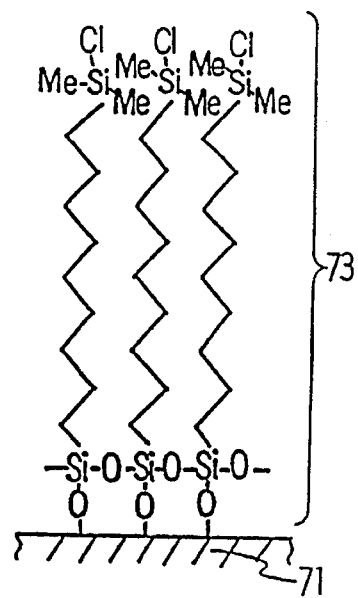
Figure 14:
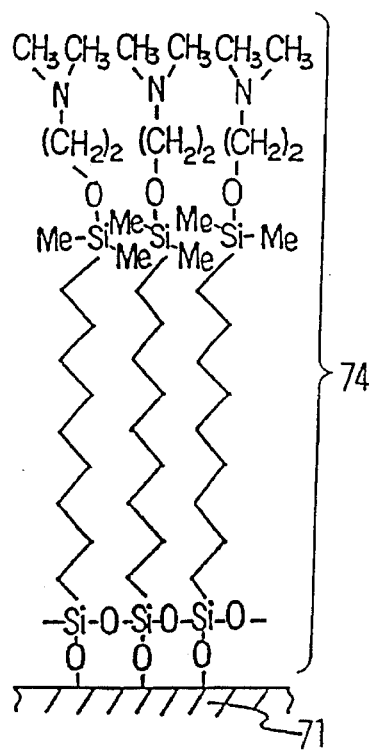
Figure 14:
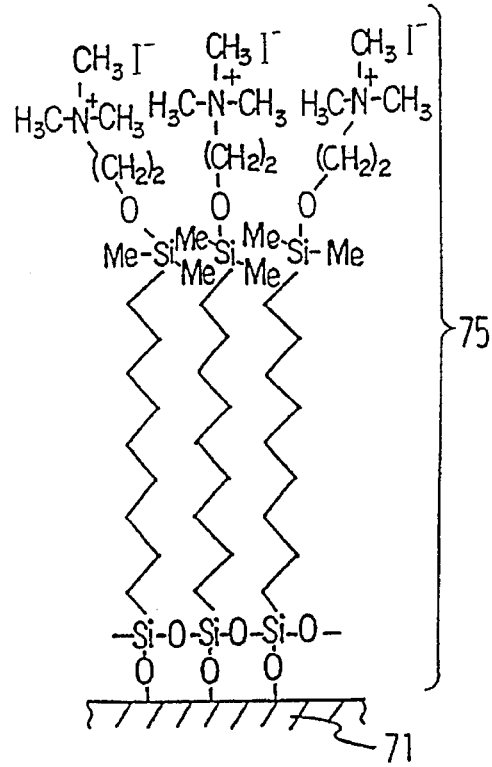

Polyester fibers 71 with the surfaces thereof oxidized were prepared (FIG. 14(a)), then washed. The fibers were dipped and held for about five hours in a non-aqueous solution containing an adsorbed material having a chlorosilyl group at each end, e.g., a solution containing cyclohexane, prepared by dissolving about 2% by weight of

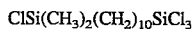

A dehydrochlorination reaction was brought about between chlorosilyl (—SiCl) groups in the material containing a chlorosilyl group at each end and hydroxyl groups 72 numerously contained at the fiber surfaces. The fibers were then washed with freon 113 to remove unreacted material remaining on the surface. Thus, bonds formed above in the formula 23 were produced over the entire fiber surfaces.

A monomolecular film 73 containing chlorosilyl groups thus could be formed. The film was chemically (or covalently) bonded to the fiber surfaces (FIG. 14(b)). The treated fibers were then dipped in a cyclohexane solution containing 10% by weight of $(CH_3)_2N(CH_2)_2OH$ causing a dehydrochlorination reaction. The fibers were then washed with freon 113. Thus, a monomolecular film 74 represented by formula [28] could be obtained (FIG. 14(c)).

[Formula 28]

The fibers were then further dipped in a cyclohexane solution obtained by dissolving $CH_3I$ containing iodine as halogen atom for circulating current for two hours. Thus, a very highly hydrophilic monomolecular film 75 could be obtained (FIG. 14(d)), which contained quarternary amino groups at the surface, as represented by formula [29].

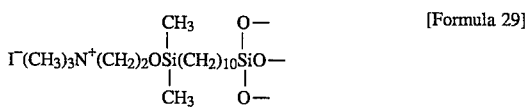

[Formula 29]

The film was not separated by washing as well. The treated polyester fibers were used in a knit braiding to produce golf wear for trial use. The golf wear was excellently water- and moisture-permeable and comfortable when worn.

EXAMPLE 12

Introduction of an —$NO_2$ Group

Figure 15:
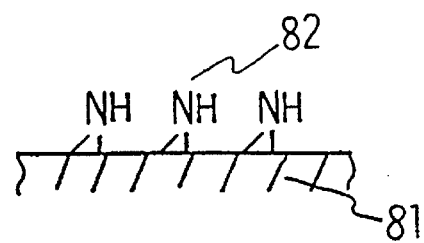
FIGS. 15(a)–(c) show a nylon fiber as in examples 12 and 19 of the invention.
Figure 15:
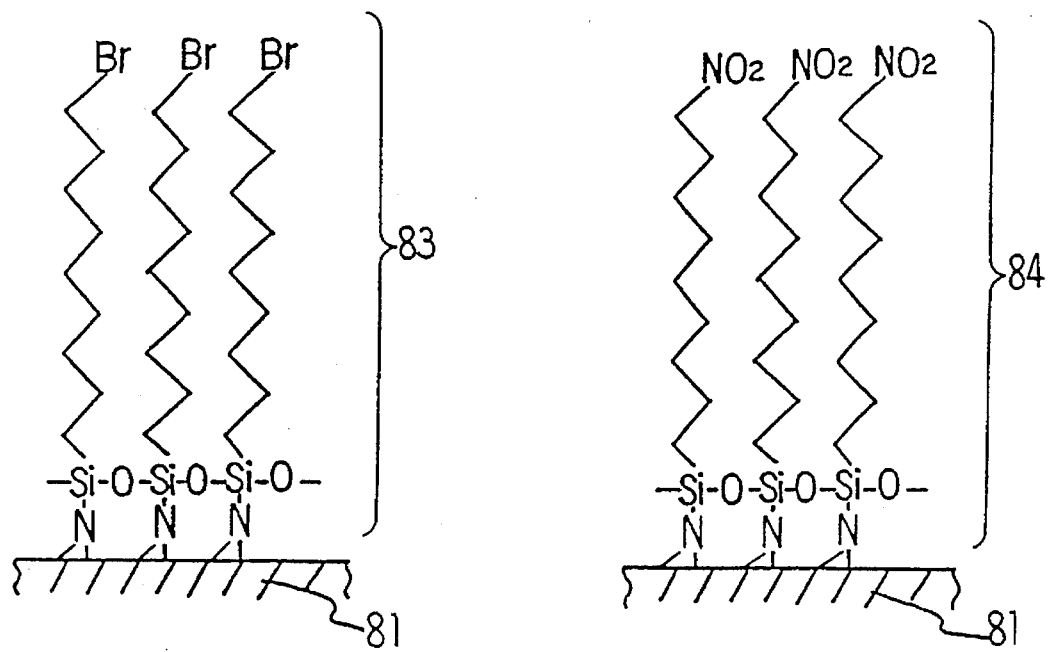

Nylon fibers 81 (FIG. 15(a)) were prepared and washed with an organic solution. The fibers were dipped and held for about five hours in a non-aqueous solution containing an adsorbed material having a bromo or iodo and a chlorosilyl group, e.g., a solution containing "Aflood" noted above, prepared by dissolving about 2% by weight of $Br(CH_2)_{10}SiCl_3$. A dehydrochloroination reaction was thus brought about between chlorosilyl (—SiCl) groups in the material containing a bromo or iodo and a chlorosilyl group and imino groups 82 numerously contained at the fiber surfaces. The fiber was then washed with "Aflood" to remove unreacted material remaining on the surface. Thus, bonds formed by formula [30] were produced over the entire fiber surfaces.

[Formula 30]

A monomolecular film 83 containng bromo groups thus could be formed. The film was chemically (or covalently) bonded to the fiber surfaces, and its thickness weas about 1.5 nm (FIG. 15(b)).

The treated fibers were then reacted in an alkaline aqueous solution containing 5% by weight of $AgNO_3$ at 80° C. for two hours. Thus, a hydrophilic monomolecular film 84 (FIG. 15(c)) represented by formula [31] could be obtained.

[Formula 31]

This momomolecular film was very firmly chemically (or covalently) bonded to the fibers and did not separate at all. Also, it did not separate by washing. The treated nylon fibers were used to produce a tricot braiding coat for trial use. The coat was excellently water- and moisture-permeable and comfortable when worn.

EXAMPLE 13

Introduction of a Thiocyano (—SCN) Group

Figure 16A:
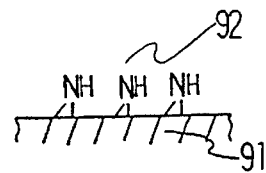
FIGS. 16(a)–(e) show a nylon fiber as in examples 13 and 14 of the invention.
Figure 16B:
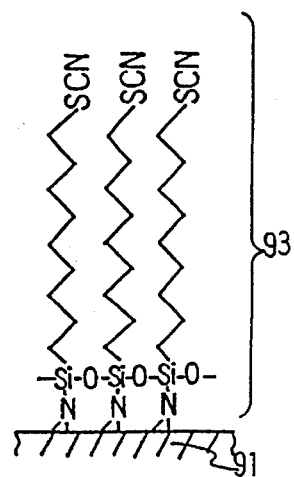
Figure 16C:
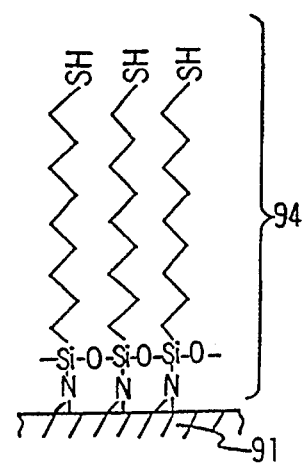
Figure 16D:
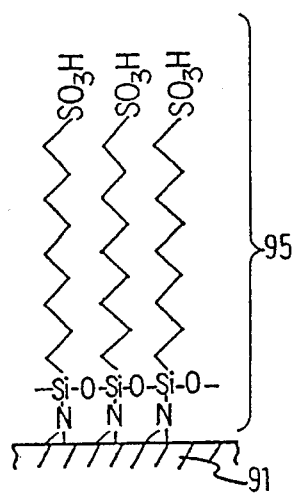
Figure 16E:
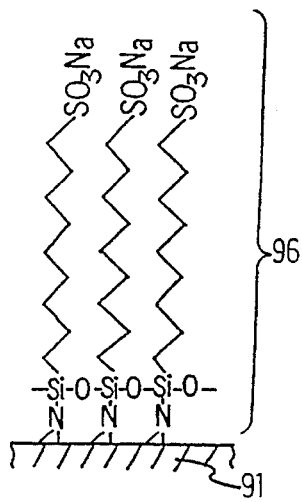

Nylon fibers 91 were prepared (FIG. 16(a)) and washed with an organic solution. The fibers were dipped and held for about five hours in a non-aqueous solution containing an adsorbed material having thiocyano (—SCN) and chlorosilyl groups, e.g., a solution containing cyclohexane, prepared by dissolving 2% by weight of $NCS(CH_2)_{10}SiCl_3$. A dehydrochlorination reaction was thus brought about between chlorosilyl (—SiCl) groups in the material and imino groups 92 numerously contained at the fiber surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in formula [32]. Drying temperature may be room temperature or above.

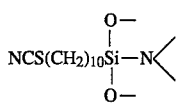
[Formula 32]

A monomolecular film 93 containing thiocyano groups thus could be obtained (FIG. 16(*b*)). The film was chemically (or covalently) bonded to the fiber surfaces. Its thickness was about 1.5 nm.

The treated fibers were then dipped in ether containing lithium aluminum halide dissolved therein (10 mg/ml) for four hours. Thus, a hydrophilic monomolecular film 94 (FIG. 16(*c*)) represented by formula [33] was obtained.

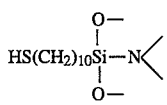
[Formula 33]

The film did not separate by washing. The treated nylon fibers were used to produce braided stockings for trial use. The stockings were excellently water- and moisture-permeable and comfortable when worn.

EXAMPLE 14

Introduction of a —SO$_3$H Group

The monomolecular film 94 (FIG. 16(*c*)) obtained in Example 13 and represented by formula 26 shown above was dipped in a mixed solution containing 10% by weight hydrogen peroxide and 10% by weight acetic acid in a volume ratio of 1:5 at a temperature of 40° to 50° C. for 30 minutes. Thus, a highly hydrophilic monomolecular film 95 (FIG. 16(*d*)) represented by formula [34] was obtained.

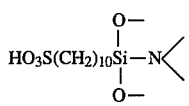
[Formula 34]

The treated fibers were then dipped in an aqueous solution obtained by dissolving about 2% by weight of an alkali or alkali earth metal compound, e.g., NaOH. Thus, a very highly hydrophilic film 96 (FIG. 16(*e*)) represented by formula [35] were formed.

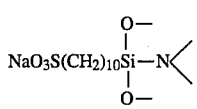
[Formula 35]

The film did not separate by washing. The treated nylon fibers were used to produce braided stockings for trial use. The stockings were comfortable when worn.

As in the above example, hydrophilic functional groups are chemically adsorbed, i.e., chemically (or covalently) bonded, via silicon groups to the surface of the apparel material. Thus, the surfaces of hydrophobic fibers may be made hydrophilic. The chemically adsorbed film will not separate when the clothing is taken on and off or is washed. In addition, it does adversely effect instrinsic characteristics such as elasticity and water repellancy the apparel products. In addition, it is excellently water- and moisture-permeable and can improve comfort when worn. Further, it permits apparel material to be comparatively freely made hydrophilic to a desired level.

EXAMPLE 15

Introduction of an —OH Group

Figure 10:
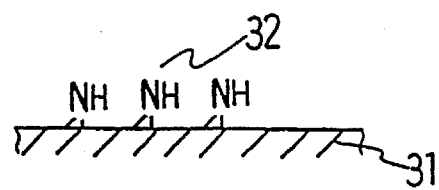
FIGS. 10(a)–(d) show a nylon fiber as in examples 7 and 15 of the invention.
Figure 10:
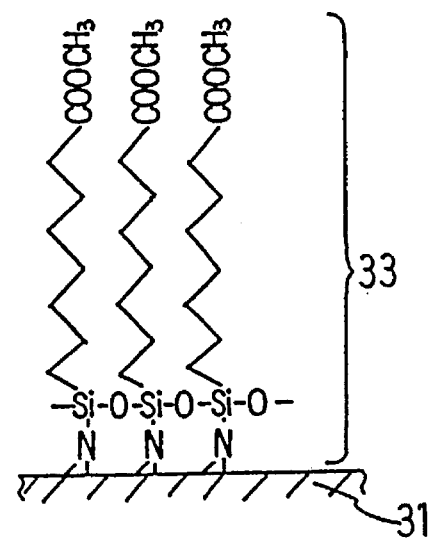
Figure 10:
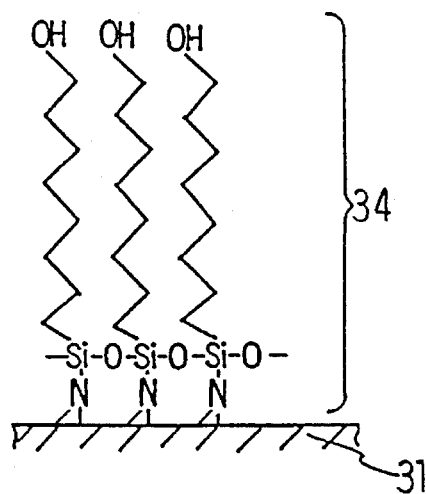
Figure 10:
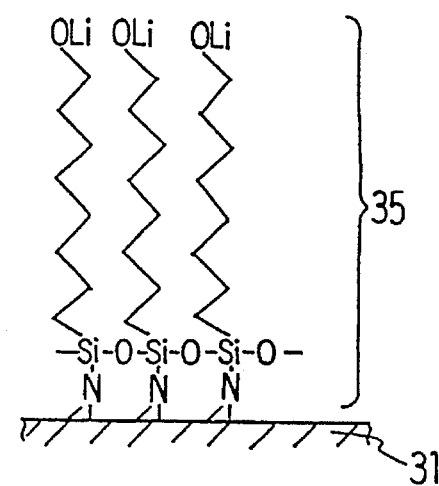

Treated nylon synthetic fiber filaments 31 (FIG. 10(*a*)) were prepared, washed with an organic solution. The fibers were dipped and held for about five hours in a non-aqueous solution containing an adsorbed material having an ester group and a chlorosilane group, e.g., a solution containing 80% by weight of n-hexadecane, 12% by weight of carbon tetrachloride and 8% by weight of chloroform, prepared by dissolving about 2% by weight of CH$_3$OOC(CH$_2$)$_7$SiCl$_3$. A dehydrochlorination reaction was thus brought about between chlorosilane (—SiCl) groups in the material containing an ester bond and a chlorosilane group and imino groups 32 contained numerously at the nylon filament surface. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying. Drying temperature may be room temperature or above.

Thus, bonds were formed as in formula [36].

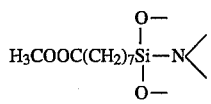
[Formula 36]

A monomolecular film 33 containing ester bonds thus was formed. The film was chemically (or covalently) bonded to the filament surface. Its thickness was about 2.0 nm (FIG. 10(*b*)).

The treated fi laments were then dippped in an ether solution containing several percent by weight of lithium aluminium hydride (LiAlH$_4$) at room temperature for reaction for 20 minutes to introduce hydrophilic hydroxyl end groups. Thus, a monomolecular film 34 (FIG. 10(*c*)) represented by formula [37] was formed.

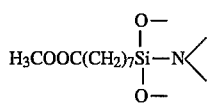
[Formula 37]

The hydrohilic filaments thus obtained were used to produce an artificial wig. Since the monomolecular film 34 was firmly chemically (or covalently) bonded to the surface, it did not separate at all by washing.

While in this embodiment the chemically adsorbed film was formed on synthetic filaments, it is possible to form a chemically adsorbed film on a processed wig as a whole.

As another example, the fibers were washed with an organic solvent and then reacted with a material containing a plurality of chlorosilyl groups, e.g., SiCl$_4$. The fibers were subsequently washed with a solvent, e.g., freon 113, and then with water. As a result, unreacted SiCl$_4$ molecules remaining on the fiber surface were removed and racted with water to obtain a siloxane monomolecular film as represented by formula [38].

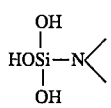
[Formula 38]

A siloxane monomolecular film greatly containing —OH groups thus could be formed. The film was chemically (or covalently) bonded to the fiber surfaces. Its thickness was about 0.3 nm.

EXAMPLE 16

Introduction of a —COOH Group

Figure 17:
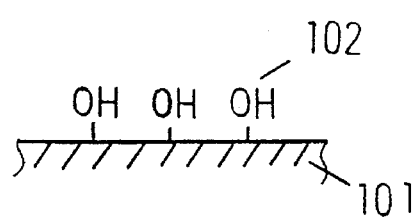
FIGS. 17(a)–(d) show an artificial wig made of a nylon fiber as in examples 16 of the invention.
Figure 17:
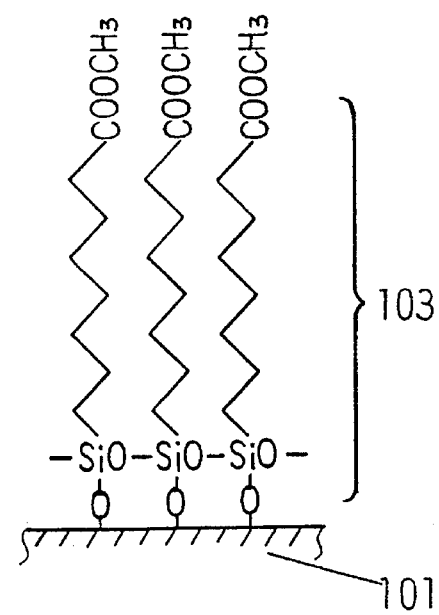
Figure 17:
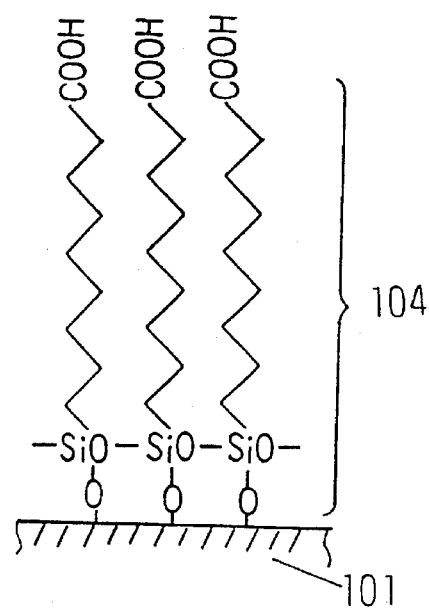
Figure 17:
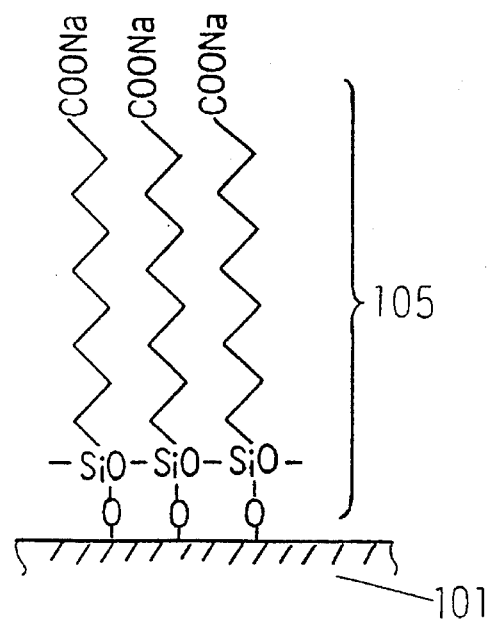

Acryl fiber filaments 101 oxidized at the surface for an artificial wig were prepared (FIG. 17(a)), and washed with an organic solution. The fibers were dipped and held for about five hours in a non-aqueous solution containing a functional group having an ester bond and also containing a chlorosilane group, e.g., a solution containing Freon 113 prepared by dissolving about 2% by weight of CH$_3$OOC(CH$_2$)$_7$SiCl$_3$. A dehydrochlorination reaction was thus brought about between chlorosilane (—SiCl) groups in the material and hydroxyl groups 102 numerously contained at the acrylic fiber filament surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [39]. Drying temperature may be room temperature or above.

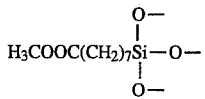
[Formula 39]

A monomolecular film 23 containing ester bonds thus could be formed. The film was chemically (or covanelty) bonded to the filament surfaces. Its thickness was about 2.0 nm (FIG. 17(b)).

The treated filaments were then dipped and held in a solution containing 36% by weight of hydrochloric acid (HCl) for reaction at 65° C. for 30 minutes to introduce hydrophilic end carboxyl groups as represented by formula [40].

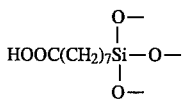
[Formula 40]

A monomolecular 104 (FIG. 17(c)) thus could be obtained. The film was firmly chemically (or covalently) bonded to the surface and did not separate at all. By treating the chemically adsorbed film with diluted NaOH aqueous solution, the carboxylic acid of the film was changed to sodium carboxylic acid salt 105 (FIG. 17(d)).

The hydrophilic filaments thus obtained were used produce an artificial wig. The wig did not collapse in the rain and was not electrically charged at all when it was not rainingfine.

EXAMPLE 17

Introduction of an —NH$_2$ Group

Nylon filaments 51 for an artificial wig were prepared (FIG. 12(a)). The filaments were dipped and held for about two hours in a non-aqueous solution containing an adsorbed material having a cyano and a chlorosilyl group, e.g., a solution containing 80% by weight of n-hexadecane (or toluene, xylene or dicyclohexyl), 12% by weight of carbon tetrachloride and 8% by weight of chloroform, prepared dissolving about 1% by weight of NC(CH$_2$)$_{17}$SiCl$_3$.

A dehydrochlorination reaction brought about between chlorosilane (—SiCl) groups in the material and imino groups 52 contained numerously at the filament surfaces. The fiber was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [41]. Drying temperature may be room temperature or above.

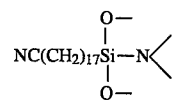
[Formula 41]

A monomolecular film 53 containing cyano groups thus could be formed. The film was chemically (or covalently) bonded to the surfaces (FIG. 12(b)).

The treated fibers were then dipped in ether containing dissolved lithium aluminium hydride (10 mg/ml) for overnight reaction. Then, the fibers were taken out from the solution and added to an ether solution containing 10% by weight hydrochloric acid. Thereafter, they were dipped and held in a triethylamine solution for two hours. A highly hydrophilic monomolecular film 53 (FIG. 12(c)) represented by formula [42] was formed.

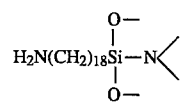
[Formula 42]

As a different example of —NH$_2$ group introduction, filaments were well water washed and dipped and held for about two hours in a non-aqueous solution containing a material containing a bromo or iodo group and a chlorosilane group, e.g., a solution containing 80% by weight of n-hexadecane (or toluene, xylene or dicyclohexyl), 12% by weight of carbon tetrachloride and 8% by weight of chloroform, prepared by dissolving about 1% by weight of Br(CH$_2$)$_{17}$SiCl$_3$. A dehydrochlorination reaction was thus brought about between chlorosilane (—SiCl) groups in the material and imino groups numerously contained at the filament surfaces. Thus, bonds represented by formula [43] over the entire filament surfaces were formed.

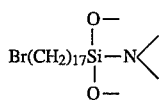 [Formula 43]

A monomolecular film containing bromo groups thus could be formed. The film was chemically (or covalently) bonded to the filament surfaces. The treated filaments were then dipped in an N,N-dimethyl formamide solution containing sodium amide dissolved therein (8 mg/ml) for overnight reaction. Thus, a monomolecular film represented by formula [44] was obtained.

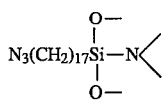 [Formula 44]

Further, the material was dipped in ether containing lithium aluminium hydride dissolved therein (10 mg/ml) for overnight reaction. Then, it was put in an empty container, and an ether solution containing 10% by weight hydrochloric acid was added. Thereafter, it was dipped in a triethylamine solution for two hours and then washed with chloroform solution. Thus, a monomolecular film represented by formula [45] and having a water-wetting angle of 60 degrees could be obtained.

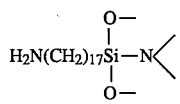 [Formula 45]

The film was very firmly chemically (or covalently) bonded to the filament surfaces and did not separate at all.

The treated filaments thus obtained were used to produce an artificial wig. The wig did not collapse in the rain and did not electrically charge when it was not raining or during low relative humidity weather conditions.

EXAMPLE 18

Introduction of a —N$^+$R$_3$X$^-$, (X represents a halogen atom) Group

Basic dyeable polyester filament fibers 71 containing surface —OH groups 71 (FIG. 14(a)) were dipped and held for about five hours in a non-aqueous solution containing a chlorosilane group at each end, e.g., a solution containing 80% by weight of n-hexadecane (or toluene, xylene or dicyclohexyl), 12% by weight of carbon tetrachloride and 8% by weight of chloroform, prepared by dissolving about 2% by weight of ClSi(CH$_3$)$_2$(CH$_2$)$_{10}$SiCl$_3$ A dehydrochlorination reaction was brought about between chlorosilane (—SiCl) groups in the material containing a chlorosilane group at each end and hydroxyl groups 72 contained at the filament surfaces. Thus, bonds represented by formula [46] were produced over the entire filament surfaces. A monomolecular film 73 containing chlorosilane groups thus could be formed. The film was chemically (or covalently) bonded to the filament surfaces (FIG. 14(b)).

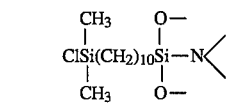 [Formula 46]

The treated filaments were then dipped in a chloroform solution containing 10% by weight of

for a dehydrochlorination reaction, and then washed with chloroform. Thus, a monomolecular film 74 (FIG. 14(c)) represented by formula [47] was obtained.

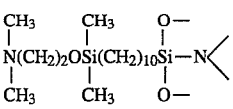 [Formula 47]

The treated filaments thus obtained were refluxed in a chloroform solution containing CH$_3$I having iodine as a halogen atom for two hours. Thus, filaments 75 (FIG. 14(d)) having surface quarternary amino groups represented by formula [48] and very highly wetted by water were obtained.

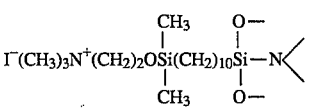 [Formula 48]

The hydrophilic filaments thus obtained were used to produce an artificial wig. The wig did not collapse in the rain and did not electrically charge at all even when it was not raining.

EXAMPLE 19

Introduction of an —NO$_2$ Group

Nylon filaments (FIG. 15(a)) as artificial wig material were prepared, washed with an organic solvent and dipped and held for about five hours in a non-aqueous solution containing a bromo or iodo or a chlorosilane group, e.g., a solution containing 80% by weight of n-hexadecane (or toluene, xylene or dicyclohexyl), 12% by weight of carbon tetrachloride and 8% by weight of chloroform, prepared by dissolving about 2% by weight of a compound represented by formula [49].

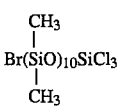 [Formula 49]

A dehydrochlorination reaction was brought about between chlorosilane (—SiCl) groups in the material containing a bromo or iodo and a chlorosilane group and imino groups numerously contained at the filament surfaces. Thus, bonds represented by formula [50] were produced over the entire filament surfaces.

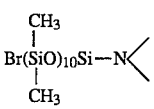 [Formula 50]

A monomolecular film 83 contaiing bromo groups thus was formed. The film was chemically (or covalently) bonded to the filament surfaces. Its thickness was about 2.5 nm (FIG. 15(b)). The treated filaments were then dipped in an alkaline aqueous solution containing 5% by weight of $AgNO_3$ for reaction at 80° C. for two hours. Thus, a hydrophilic monomolecular film 84 (FIG. 1(c)) as represented by formula [51] was obtained.

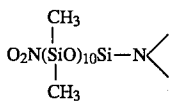
[Formula 51]

The hydrophilic filaments thus obtained were used to produce an artificial wig. The wig did not collapse in the rain and did not electrically charge even when it was not raining.

EXAMPLE 20

Introduction of a —SO₃H Group

Figure 18:
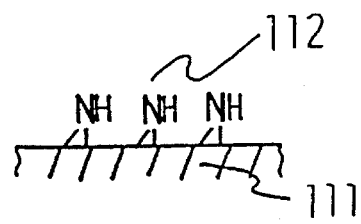
FIGS. 18(a)–(d) show an artificial wig made of a acryl fiber as in examples 20 of the invention.
Figure 18:
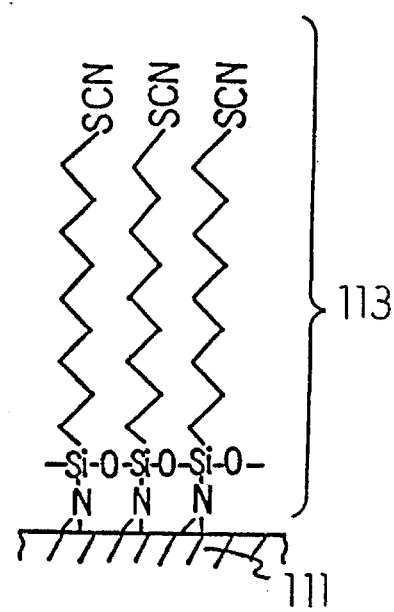
Figure 18:
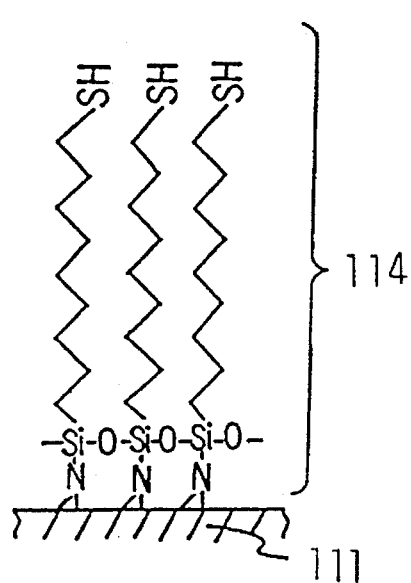
Figure 18:
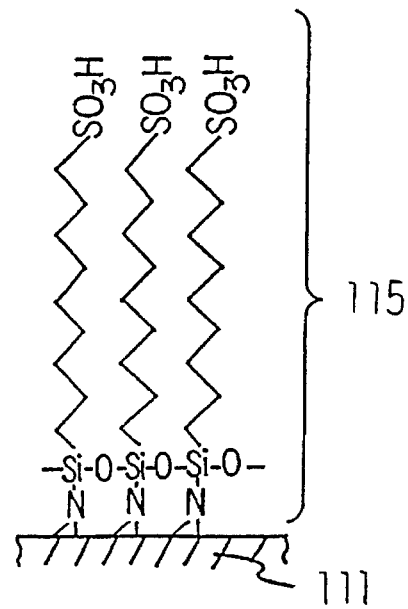

Nylon filaments as artificial wig material (FIG. 18(a)) were prepared, washed with an organic solvent and dipped and held for about five hours in a non-aqueous solution containing a material containing a thiocyano (—SCN) and a chlorosilane group, e.g., a solution containing 80% by weight of n-hexadecane (or toluene, xylene or dicyclohexyl), 12% by weight of carbon tetrachloride and 8% by weight of chloroform, prepared by dissolving 2% by weight of $NCS(CH_2)_{10}SiCl_3$. A dehydrochlorination reaction was brought about between chlorosilyl (—SiCl) groups in the material containing a thiocyano and a chlorosilane group and imino groups 112 numerously contained at the filament surfaces. Thus, bonds represented by formula [52] were produced over the entire filament surfaces.

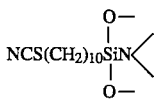
[Formula 52]

A monomolecular film containing thiocyano groups thus as formed. The film was chemically (or covalently) bonded to the filament surfaces. Its thickness was about 2.0 nm (FIG. 18(b)).

The treated filaments were then dipped in ether containing lithium aluminum halide dissolved therein (10 mg/ml) for four hours. Thus, a hydrophilic monomolecular film 114 (FIG. 18(c)) represented by formula [53] was obtained.

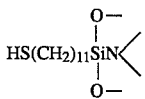
[Formula 53]

The treated filaments thus obtained were further dipped in a blend solution containing 10%-by-weight hydrogen peroxide and 10% by weight of acetic acid in a volume ratio of 1:5 at a temperature of 40° to 50° C. for 30 minutes. Thus, a highly hydrophilic monmolecular film 115 (FIG. 18(d)) as represented by formula [54] was obtained.

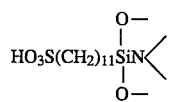
[Formula 54]

The hydrophilic filaments thus obtained were used to produce an artificial wig. The wig did not collapse in the rain and did not electrically charge even when it was not raining.

As a further example, the filaments noted above were dipped and held for about one hour in a non-aqueous solution contaiing a material containing a plurality of chlorosilane groups, e.g., a solution containing 80% by weight of n-hexadecane (or toluene, xylene or dicyclohexyl), 12% by weight of carbon tetrachloride and 8% by weight of chloroform, prepared by dissolving about 1% by weight of SiCl4, and then were washed with a Freon-based solvent and then with water. Thus, $(HO)_3SiO$— was formed on the filament surfaces containing hydroxyl and imino groups. Hydroxyl groups were thus formed in a molecular array on the surface. The surface thus obtained was considerably hydrophilic. However, by carrying out the process in any of Examples 15 to 20 subsequent to the chemical adsorption of $SiCl_4$, a higher density hydrophilic monomolecular film can be formed via the siloxane monomolecular film on the filament surfaces.

As in this example, hydrophilic groups can be secured to the surfaces of chemical synthetic fiber filaments as artificial wig material via molecules chemically adsorbed to the filament surfaces and by chemical (or covalently) bonds. Sweat spread over the entire filament surfaces, and the wig does not become musty. In addition, since the film is chemically (or covalently) bonded to the filament surfaces, it does not separate. Further, its thickness is on the order of namometers, and therefore it does not deteriorate the intrinsic elasticity or luster of the filaments. It is thus possible to provide an artificial wig, which is free from collapse and can be combed satisfactorily.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. An apparel product comprising a chemically adsorbed monomolecular film comprising molecules having stem groups bonded by covalent bonds to a surface of the apparel product, wherein said covalent bonds comprise —Si— atoms.

2. The apparel product according to claim 1, wherein said chemically adsorbed film further comprises outer surface fluorocarbon groups bonded to said stem groups.

3. The apparel product according to claim 2, wherein said apparel product is a synthetic fiber swimsuit.

4. The apparel product according to claim 1, wherein said chemically adsorbed film further comprises hydrophilic functional groups.

5. The apparel product according to claim 4, wherein said apparel product is a synthetic fiber fabric.

6. The apparal product according to claim 4, wherein said apparel product is an artificial wig having chemical or synthetic fibers.

7. The apparel product according to claim 4, wherein said hydrophilic functional groups of said chemically adsorbed film include at least one functional group selected from the group consisting of —OH, —COOH, —NH$_2$, —N$^+$R$_3$X$^-$ (where R represents an alkyl group, and X represents a halogen atom), —NO$_2$ and —SO$_3$H.

8. The apparel product according to claim 4, wherein said chemically adsorbed film is represented by the formula

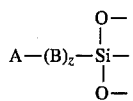

where A represents a —OH, —COOH, —NH$_2$, —N$^+$R$_3$X$^-$ (where R represents an alkyl group, and X represents a halogen atom), —NO$_2$ or —SO$_3$H group, z represents an integer from 1 to 30, and B represents a hydrocarbon group.

9. An apparel product comprising a siloxane-based monomolecular inner layer film formed on a surface of the apparel product and a chemically adsorbed monomolecular film comprising molecules having stem groups bonded by covalent bonds comprising Si atoms to the inner layer film.

10. The apparel product according to claim 9, wherein said chemically adsorbed film further comprises outer surface fluorocarbon groups bonded to said stem groups.

11. The apparel product according to claim 9, wherein the chemically adsorbed film further comprises hydrophilic functional groups.

12. The apparel product according to claim 11, wherein the hydrophilic function groups comprise at least one functional group selected from the group consisting of —OH, —COOH, —NH$_2$, —N$^+$R$_3$ X$^-$ (where R represents an alkyl group and X represents a halogen atom), —NO$_2$ and —SO$_3$H.

* * * * *